US011676314B2

(12) United States Patent
Chakraborty et al.

(10) Patent No.: US 11,676,314 B2
(45) Date of Patent: Jun. 13, 2023

(54) BOUNDARY CORRESPONDENCE DETERMINATION FOR DIGITAL OBJECTS

(71) Applicant: Adobe Inc., San Jose, CA (US)

(72) Inventors: Souymodip Chakraborty, Vasant Kunj (IN); Vineet Batra, Pitam Pura (IN); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 38 days.

(21) Appl. No.: 17/521,313

(22) Filed: Nov. 8, 2021

(65) Prior Publication Data
US 2023/0147515 A1 May 11, 2023

(51) Int. Cl.
| | | |
|---|---|---|
| G06T 11/20 | (2006.01) | |
| G06T 13/80 | (2011.01) | |
| G06N 3/08 | (2023.01) | |
| G06T 11/40 | (2006.01) | |

(52) U.S. Cl.
CPC .............. G06T 11/203 (2013.01); G06N 3/08 (2013.01); G06T 11/40 (2013.01); G06T 13/80 (2013.01)

(58) Field of Classification Search
CPC ....... G06T 11/203; G06T 11/40; G06T 13/80; G06N 3/08
See application file for complete search history.

(56) References Cited

U.S. PATENT DOCUMENTS

| | | | | |
|---|---|---|---|---|
| 8,682,143 | B2 * | 3/2014 | Takagi | H04N 5/76 386/280 |
| 2014/0094952 | A1 * | 4/2014 | Goldman | D05B 19/08 700/138 |
| 2018/0158199 | A1 * | 6/2018 | Wang | G06T 7/33 |
| 2019/0108662 | A1 * | 4/2019 | Donahue | G06T 3/20 |
| 2020/0167981 | A1 * | 5/2020 | Tagra | G06T 11/60 |
| 2020/0334874 | A1 * | 10/2020 | Phogat | G06T 11/001 |
| 2020/0334878 | A1 * | 10/2020 | Tailang | G06F 16/5838 |

(Continued)

OTHER PUBLICATIONS

Belongie, Serge et al., "Shape context: a new descriptor for shape matching and object recognition", Proceedings of the 13th International Conference on Neural Information Processing Systems [retrieved Aug. 31, 2021]. Retrieved from the Internet <https://citeseerx.ist.psu.edu/viewdoc/download?doi=10.1.1.917.9664&rep=rep1&type=pdf>., Jan. 2000, 7 Pages.

(Continued)

*Primary Examiner* — Michael Le
(74) *Attorney, Agent, or Firm* — FIG. 1 Patents

(57) ABSTRACT

Boundary correspondence determination techniques are described for digital objects as implemented by a boundary correspondence system. In an implementation, the boundary correspondence system partitions outer boundaries of first and second digital objects into a first plurality of cuts and a second plurality of cuts, respectively. A set of corresponding cut pairs are then determined based on a comparison of the first plurality of cuts with the second plurality of cuts. Further, corresponding anchor point pairs are determined based on a comparison of anchor points of the set of corresponding cut pairs. The boundary correspondence system then generates and outputs a mapping of the first digital object to the second digital object based on the determined correspondence of anchor point pairs.

20 Claims, 13 Drawing Sheets
(4 of 13 Drawing Sheet(s) Filed in Color)

(56) References Cited

U.S. PATENT DOCUMENTS

2021/0357745 A1* 11/2021 Wallis ................ G06N 3/04
2022/0101549 A1* 3/2022 Sadeghi ............... G06V 20/58

OTHER PUBLICATIONS

Belongie, Serge et al., "Shape matching and object recognition using shape contexts", IEEE Transactions on Pattern Analysis and Machine Intelligence, vol. 24, No. 4 [retrieved Aug. 31, 2021]. Retrieved from the Internet <http://www.ee.iisc.ac.in/new/people/faculty/soma.biswas/STIP_pdf/ShapeContext.pdf>., Apr. 2002, 14 Pages.

Besl, Paul J. et al., "A Method for Registration of 3-D Shapes", IEEE Transactions on Pattern Analysis and Machine Intelligence, vol. 14, No. 2 [retrieved Aug. 31, 2021]. Retrieved from the Internet <http://www.compsci.hunter.cuny.edu/~ioannis/besl-mckay-icp-pami92.pdf>., Feb. 1992, 18 pages.

Golub, G. H. et al., "Singular value decomposition and least squares solutions", In: Bauer F.L. (eds) Linear Algebra. Handbook for Automatic Computation, vol. 2. Springer, Berlin, Heidelberg [retrieved Aug. 31, 2021]. Retrieved from the internet <https://people.duke.edu/~hpgavin/SystemID/References/Golub+Reinsch-NM-1970.pdf>., Apr. 1970, 18 Pages.

Jacobson, Alec et al., "Bounded Biharmonic Weights for Real-Time Deformation", In ACM SIGGRAPH 2011 Papers, SIGGRAPH '11 [retrieved on Aug. 31, 2021]. Retrieved from the Internet <https://igl.ethz.ch/projects/bbw/bounded-biharmonic-weights-siggraph-2011-compressed-jacobson-et-al.pdf>., Jul. 2011, 8 pages.

Koch, Gregory et al., "Siamese Neural Networks for One-shot Image Recognition", ICML deep learning workshop, vol. 2 [retrieved Sep. 15, 2021]. Retrieved from the Internet <http://www.cs.toronto.edu/~gkoch/files/msc-thesis.pdf>., Jan. 2015, 30 pages.

Mannor, Shie et al., "The cross entropy method for classification", ICML '05: Proceedings of the 22nd international conference on Machine learning [retrieved Aug. 31, 2021]. Retrieved from the Internet <https://icml.cc/Conferences/2005/proceedings/papers/071_CrossEntropy_MannorEtAl.pdf>., Aug. 2005, 8 Pages.

Van Kaick, Oliver et al., "A survey on shape correspondence", Computer Graphics Forum, vol. 30, No. 6 [retrieved Aug. 31, 2021]. Retrieved from the Internet <http://citeseerx.ist.psu.edu/viewdoc/download?doi=10.1.1.221.1528&rep=rep1&type=pdf>., Jul. 11, 2011, 24 Pages.

* cited by examiner

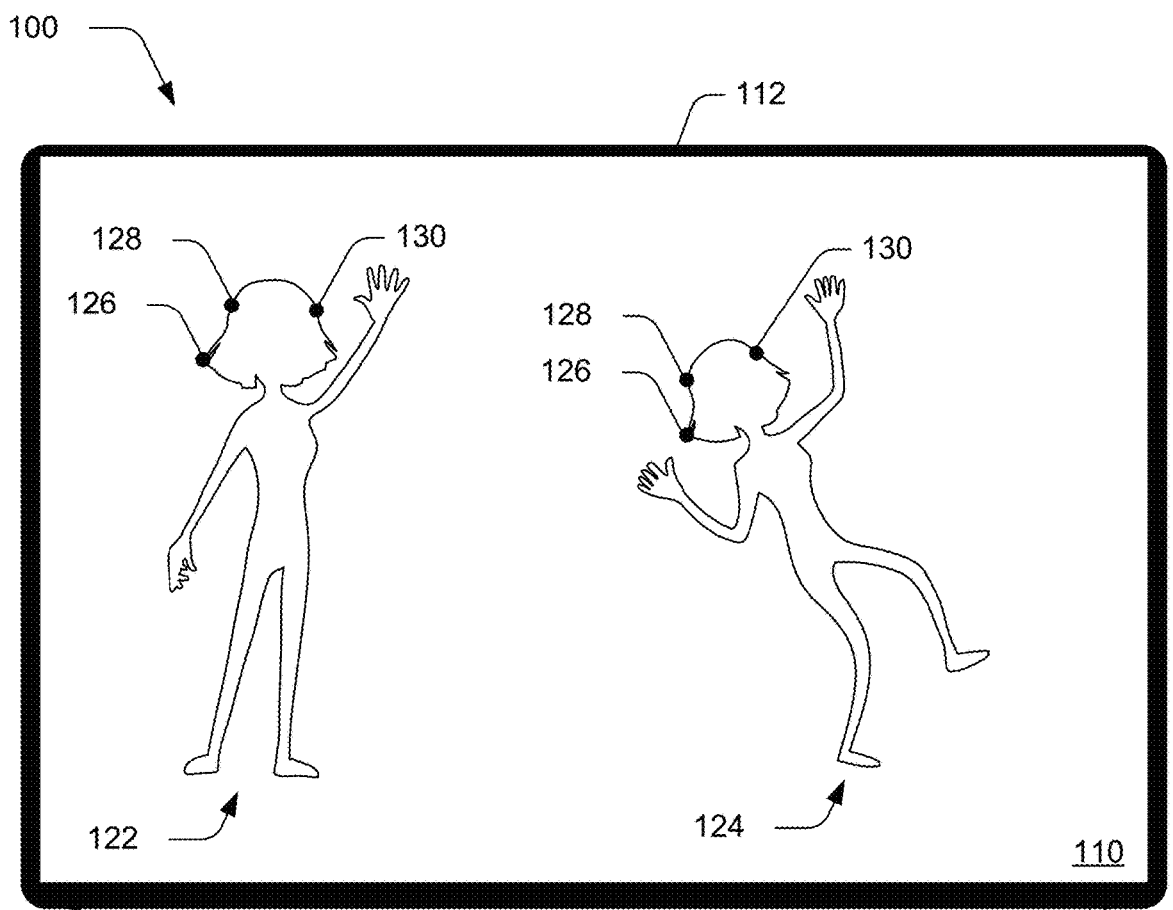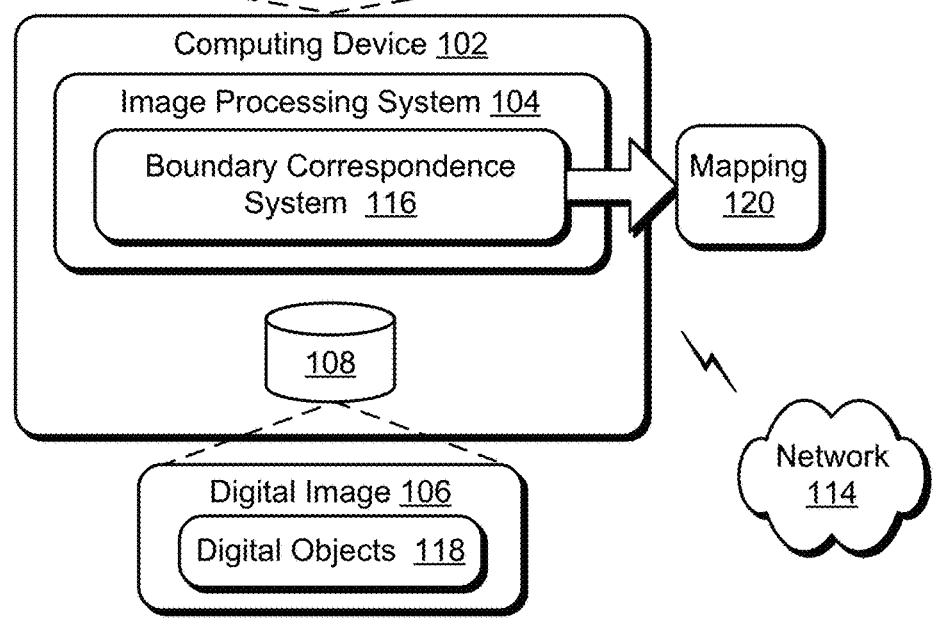
Fig. 1

BOUNDARY CORRESPONDENCE DETERMINATION FOR DIGITAL OBJECTS

BACKGROUND

Digital image processing systems are configured to support a wide variety of functionality to create and edit digital images and digital objects within the digital images. These digital image processing systems rely on a correspondence determined between multiple digital objects in order to perform a multitude of functions. For instance, automatically generating frames of an animation involves interpolating between multiple digital objects using a determined correspondence for the multiple digital objects in order to generate the frames used to create the animation.

Conventional techniques implemented by image processing systems, however, fail to determine a robust and accurate correspondence between digital objects. By way of example, these conventional techniques fail to generate a correspondence that maintains an ordered sequence of points along outer boundaries of multiple digital objects. Thus, a digital object correspondence determined using conventional techniques often indicates correspondence between point pairs that are misplaced within the context of the digital objects as a whole. Moreover, these conventional techniques produce a different correspondence result depending on the orientation of the digital objects. This causes an inaccurate determination of correspondence between the digital objects and consequently failure of techniques that rely on this correspondence, e.g., automatic animation generation. Due to the inability of conventional techniques to establish a robust and accurate digital object correspondence, conventional digital image processing systems fail to adequately perform functions that rely on the digital object correspondence and result in an inefficient use of computational resources.

SUMMARY

Boundary correspondence determination techniques are described as implemented by a boundary correspondence system to determine a robust and accurate correspondence between two digital objects. In one example, the boundary correspondence system partitions an outer boundary of a first digital object into a first plurality of cuts and an outer boundary of a second digital object into a second plurality of cuts. The boundary correspondence system then compares the first plurality of cuts with the second plurality of cuts. In doing so, a neural network trained using deep learning is leveraged to determine a measure of similarity between each respective cut from the first plurality of cuts with each respective cut from the second plurality of cuts.

Based on the comparison, the boundary correspondence system determines a set of corresponding cut pairs such that each cut pair in the set includes a cut from the first plurality of cuts and a cut from the second plurality of cuts. For instance, a first cut pair is identified based on the comparison, and further cut pairs are determined by iteratively processing cuts of the first and second pluralities of cuts adjacent to the first cut pair in a directional manner. The boundary correspondence system then determines corresponding anchor point pairs by comparing the anchor points of corresponding cut pairs such that a corresponding anchor point pair is determined for each corresponding cut pair. The boundary correspondence system generates a mapping of the first digital object to the second digital object. The mapping, for instance, includes the corresponding anchor point pairs disposed on the outer boundaries of the first and second digital objects. The mapping is then output by the boundary correspondence system.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ boundary correspondence determination techniques described herein.

DETAILED DESCRIPTION

Overview

Figure 2:
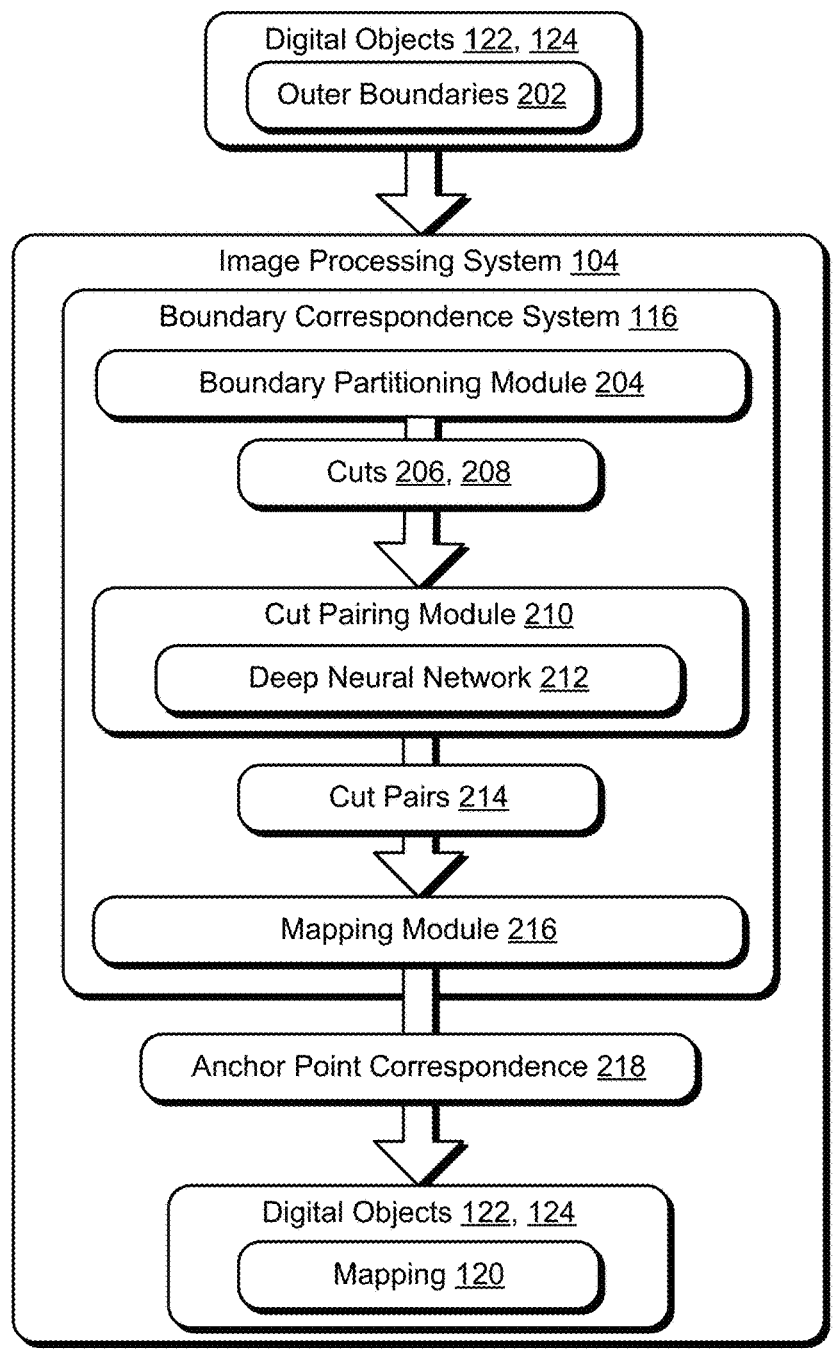
FIG. 2 depicts a system in an example implementation showing operation of the boundary correspondence system of FIG. 1 in greater detail to generate a mapping.

Digital image processing systems support a multitude of functions to create and edit digital objects contained within digital images, e.g., raster objects, vector objects, and so on. The digital image processing systems rely on a correspondence determined between multiple digital objects in order to perform many of these functions. However, due to the inability of conventional techniques to determine a robust and accurate correspondence between digital objects, conventional digital image processing systems fail to adequately perform these functions that rely on the determined digital object correspondence.

Generally, correspondence between two digital objects is represented by points along a boundary of a first digital object that correspond to points along a boundary of a second digital object. Conventional techniques, however, rely on discrete portions of the digital objects in order to analyze and describe correspondence. In doing so, these conventional techniques ignore the placement of a respective portion of a digital object within the context of the digital object as a whole. Due to this, a determination of digital object correspondence using conventional techniques often includes corresponding point pairs that are misplaced within the context of the digital object as a whole. Moreover, failure to evaluate a portion of a digital object within the context of the digital object as a whole leads these conventional techniques to produce a different correspondence result depending on the orientation of the first and second digital objects. As a result, an inaccurate digital object correspondence is determined if the multiple digital objects are not aligned properly.

These challenges associated with conventional techniques are further exacerbated by a degree of difference associated with the two digital objects. For instance, digital object correspondence results as determined by conventional techniques are often inaccurate and incomplete if the two digital objects are not associated with a same or similar number of points. Conventional techniques are also inaccurate and incomplete if the two digital objects are not affine variants of one another. As a result, conventional techniques fail to determine a robust and accurate correspondence between two digital objects.

Accordingly, boundary correspondence determination techniques are described as implemented by an image processing system to determine a robust and accurate correspondence between two digital objects. These techniques overcome technical challenges of conventional techniques to generate a correspondence that maintains an ordered sequence of corresponding points across the two digital objects, is invariant to orientation, and improves upon the accuracy and computational efficiency of computing devices that implement these techniques. The image processing system, for instance, receives a user input specifying first and second digital objects, for which, the image processing system is to determine correspondence. The digital objects are configurable in a variety of ways, examples of which include vector objects, such as sets of Bezier segments, other mathematically defined visual objects, raster objects, and so forth. Moreover, the digital objects are configurable as two-dimensional digital objects or three-dimensional digital objects.

Regardless of the configuration of the digital objects, outer boundaries representing outlines or borders of the two digital objects are defined. A boundary correspondence system is then employed to determine correspondence between the outer boundaries of the two digital objects. To do so, the boundary correspondence system partitions the outer boundaries of each of the two digital objects into a plurality of cuts. A "cut" of a respective digital object is a smaller portion or segment of the outer boundary associated with the respective digital object. In accordance with this functionality, the outer boundary of the first digital object is partitioned into a first plurality of cuts and the outer boundary of the second digital object is partitioned into a second plurality of cuts.

The first plurality of cuts includes a sequence of cuts of increasing lengths, each centered at a point on the boundary of the first digital object. In addition, the second plurality of cuts includes a sequence of cuts of increasing lengths, each centered at a point on the boundary of the second digital object. Thus, each subsequent cut in the sequence of a respective plurality of cuts includes the portion of the outer boundary represented by the previous cut in the sequence as well as an additional portion of the outer boundary. By using the first plurality of cuts and the second plurality of cuts as a basis for determining boundary correspondence between the first digital object and the second digital object, the boundary correspondence system captures the relative placement of a respective cut within the context of the digital object as a whole.

The boundary correspondence system then compares the first plurality of cuts with the second plurality of cuts. In some implementations, this comparison is performed by determining a measure of similarity for each respective cut from the first plurality of cuts with each respective cut from the second plurality of cuts. Prior to comparing two cuts, however, the principal axes of the two cuts are determined and aligned. As a result, the position and/or orientation of the two cuts being compared does not affect the measure of similarity between the two cuts, as opposed to conventional techniques.

In some implementations, the boundary correspondence system leverages a neural network trained using deep learning to determine a measure of similarity between two cuts. The neural network is trained on a list of tuples, in which each tuple contains two images and an indication of whether the two images are similar. To generate the list of tuples, a training module receives a number of training boundaries and partitions each of the training boundaries into a plurality of seed training cuts. The training module then generates an altered training cut by arbitrarily moving control points disposed along a respective seed training cut by a perturbation factor. The two images of a respective tuple correspond to the seed training cut and the altered training cut, and the similarity indication of the respective tuple is based on the value of the perturbation factor. For instance, the two images are indicated as similar if the perturbation factor is less than a threshold value. Alternatively or in addition, the two images are indicated as dissimilar if the perturbation factor is greater than the threshold value. Notably, this process can be repeated multiple times for the same seed training cut, for other seed training cuts of the same training boundary, as well as for other seed training cuts of additional training boundaries. Therefore, a sufficiently large list of tuples is generated for training the neural network from a relatively small number of input boundaries.

The boundary correspondence system then determines a set of corresponding cut pairs based on the comparison of the first plurality of cuts with the second plurality of cuts such that each cut pair includes a cut from the first plurality of cuts and a cut from the second plurality of cuts. In accordance with this functionality, a first cut pair is determined based on the determined measures of similarity. For instance, the first cut pair is identified as having a highest measure of similarity from among each of the possible cut pairs between the first and second pluralities of cuts. Once the first cut pair is determined, the boundary correspondence system determines additional cut pairs by iteratively processing cuts of the first and second pluralities of cuts adjacent to the first cut pair in a directional manner By way of example, the boundary correspondence system determines an adjacent cut pair that includes cuts located adjacent to and clockwise relative to the first cut pair. Further cut pairs include cuts located adjacent to and clockwise relative to the adjacent cut pair, and so forth. By pairing cuts directionally and using the paired cuts as a basis for determining correspondence, the boundary correspondence system maintains an ordered sequence of corresponding point pairs across two digital objects.

The boundary correspondence system then determines corresponding anchor point pairs. To do so, the boundary correspondence system compares the anchor points of corresponding cut pairs such that a corresponding anchor point pair is determined for each corresponding cut pair. Notably, an "anchor point" of a cut is a point disposed on the cut. Based on the corresponding anchor point pairs, the boundary correspondence system generates and outputs a mapping of the first digital object to the second digital object. For instance, a mapping is generated that includes corresponding anchor point pairs disposed on the outer boundaries of the first digital object and the second digital object. In some implementations, the corresponding anchor points of the mapping are disposed in an ordered sequence along the outer boundaries of the first and second digital objects. In accordance with this functionality, the anchor points of a corresponding anchor point pair are associated with a same number in the ordered sequence. The mapping is then output, which is performable in a variety of ways. Examples of outputs include rendering the mapping for display in a user interface by a display device or outputting the mapping for a further function of the image processing system, such as generating an interpolation between the first digital object and the second digital object.

Accordingly, a digital object correspondence determined by the boundary correspondence system maintains an ordered sequence of corresponding points across two digital objects, is invariant to orientation, improves upon the accuracy of conventional systems, and improves operational efficiency of computing devices that implement these techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 14.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital image 106 is illustrated as a boundary correspondence system 116. The boundary correspondence system 116 is configured to receive at least first and second digital objects 118, and from this, generate a mapping 120 of the first digital object to the second digital object. The digital objects 118 are configurable in a variety of ways, examples of which include vector objects, such as sets of Bezier segments, other mathematically defined visual objects, raster objects, and so forth. The digital objects 118 are also configurable as two-dimensional or three-dimensional digital objects 118. Regardless of the configuration of the digital objects 118, the boundary correspondence system 116 defines outer boundaries representing outlines or borders of the digital objects 118.

The boundary correspondence system 116 is configured in the example to receive and define outer boundaries of a first digital object 122 and a second digital object 124. As depicted in the user interface 110, the boundary correspondence system 116 is then employed to generate a mapping 120 of the first digital object 122 to the second digital object 124.

Included as part of the mapping 120 are corresponding anchor point pairs 126, 128, 130 that represent points on the first digital object 122 that correspond to points on the second digital object 124. For instance, corresponding anchor point pair 126 includes an anchor point of the first digital object 122 and an anchor point of the second digital object 124 that correspond to one another. When the first digital object 122 and the second digital object 124 are viewed together, a location of the anchor point 126 on the first digital object 122 corresponds to a location of the anchor point 126 on the second digital object 124, despite the first digital object 122 being different than the second digital object 124. Although the example mapping 120 is depicted as having three anchor point pairs disposed on a portion of the digital objects 122, 124 for illustrative purposes, it is to be understood that the boundary correspondence system 116 is capable of determining any number of anchor point pairs disposed on other portions or the entirety of the digital objects 122, 124.

These techniques, as implemented by the boundary correspondence system 116, generate a mapping 120 that maintains an ordered sequence of corresponding anchor point pairs 126, 128, 130 across the two digital objects 122, 124 and is invariant to initial orientation of the two digital objects 122, 124. Further, a mapping 120 generated by the boundary correspondence system 116 has increased accuracy, as compared to conventional techniques. As a result, the image processing system 104 performs additional functions that rely on the generated mapping 120 with increased accuracy, such as automatic animation generation, as further described and shown in relation to FIGS. 12 and 13 below.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Boundary Correspondence Determination

Figure 3:
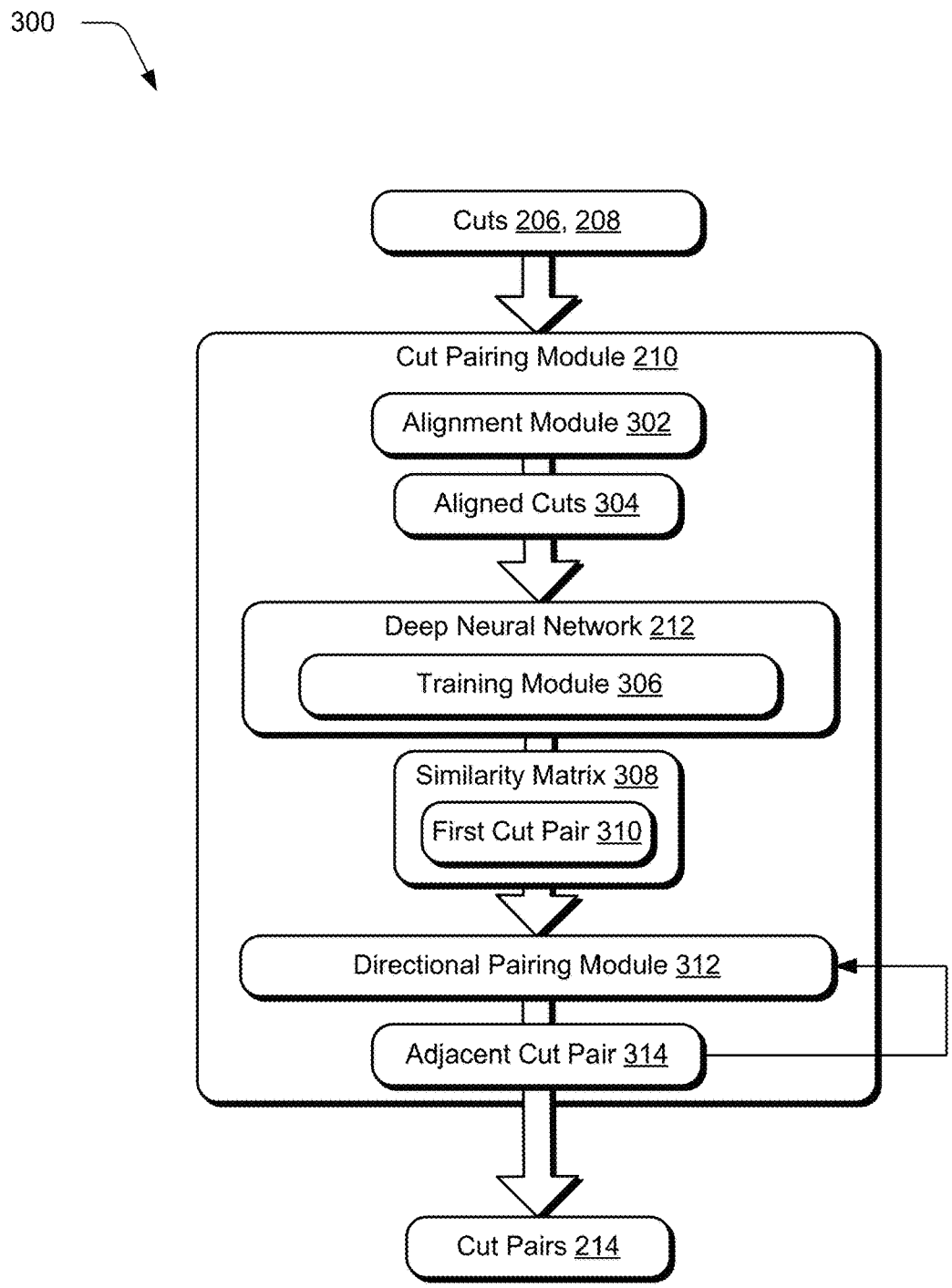
FIG. 3 depicts a system in an example implementation showing operation of the cut pairing module of FIG. 2 in greater detail to determine a set of corresponding cut pairs.
Figure 4:
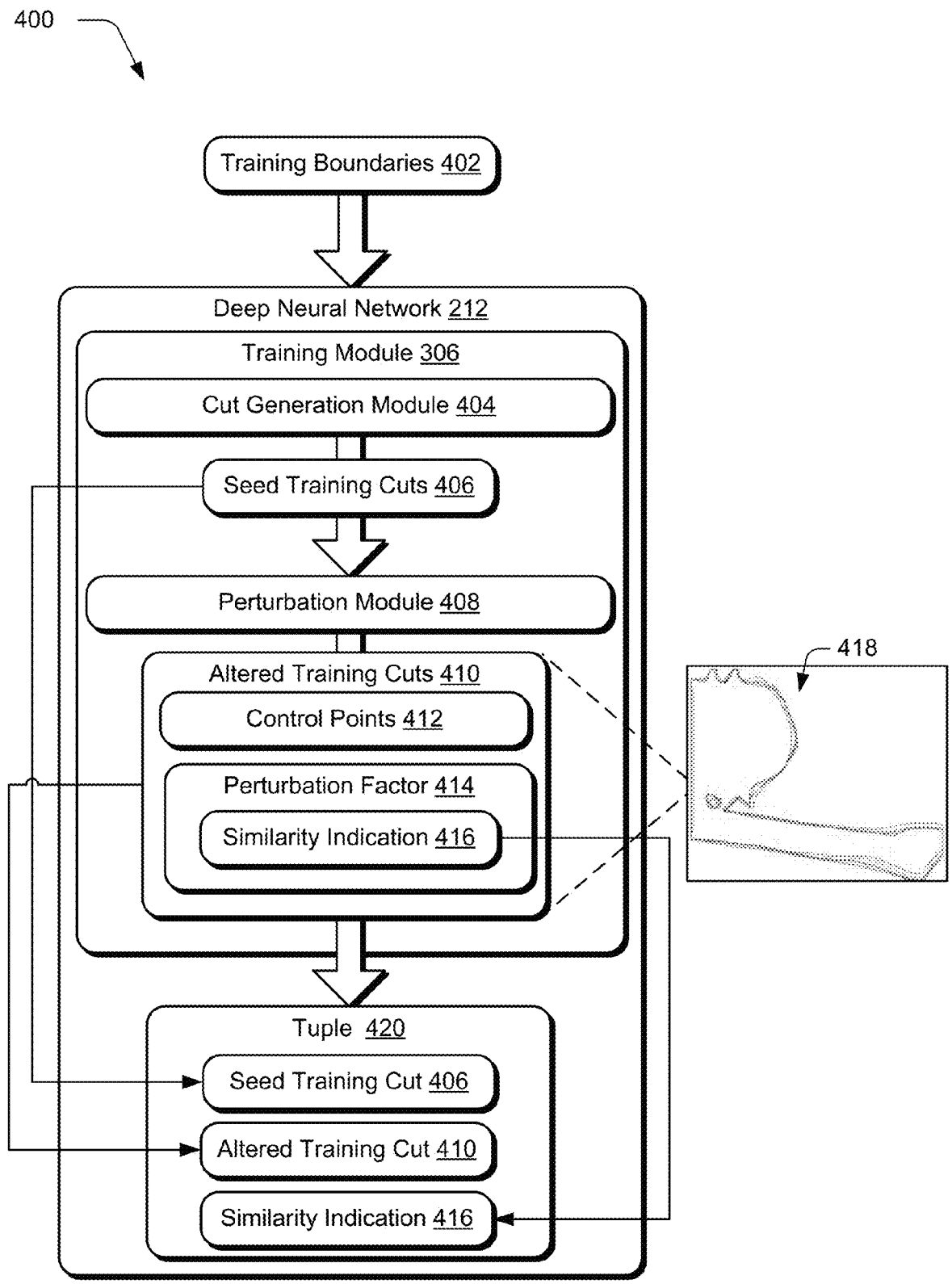
FIG. 4 depicts a system in an example implementation showing operation of the training module of FIG. 3 in greater detail to generate a list of tuples, based on which, the cut pairing module is trained to determine similarity between cuts.
Figure 5:
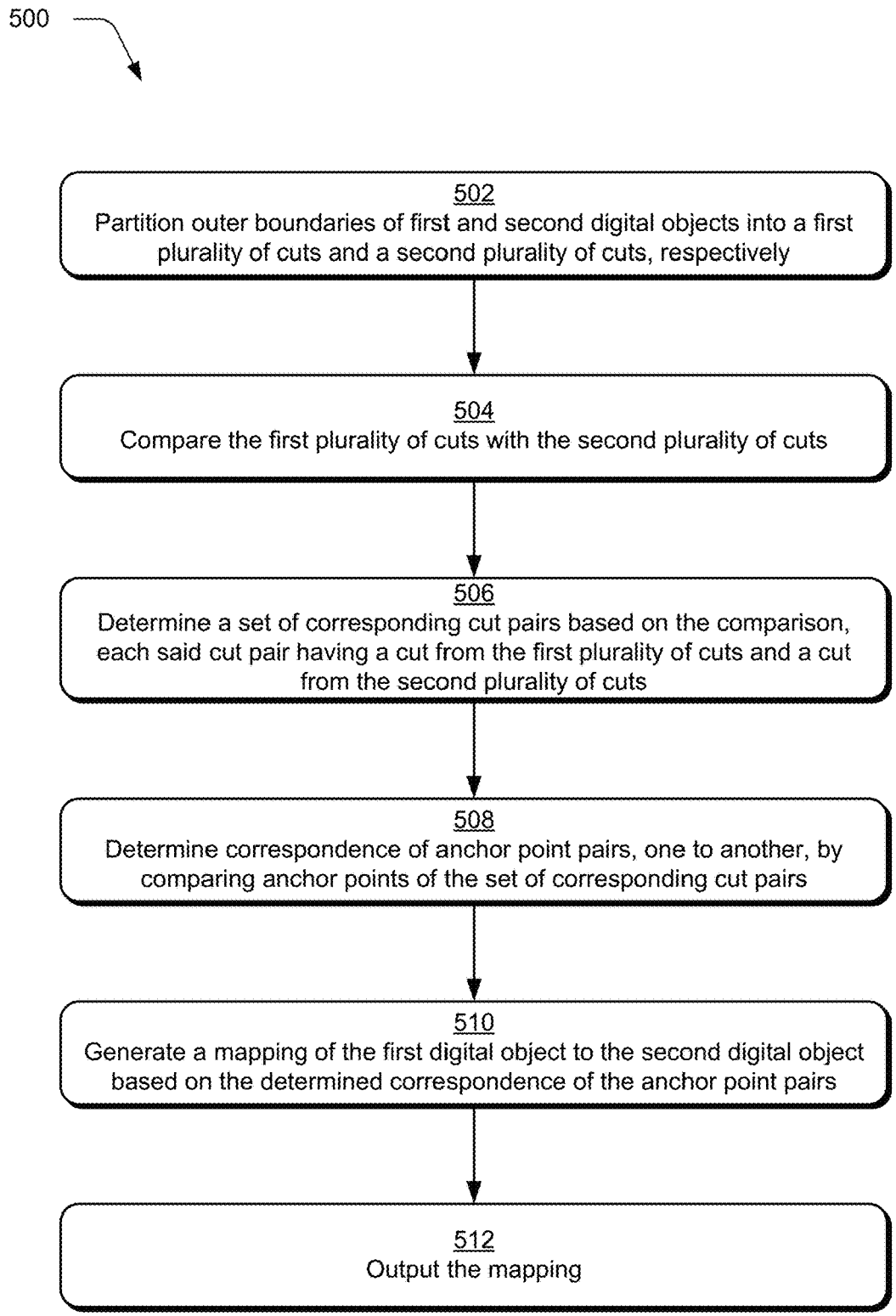
FIG. 5 is a flow diagram depicting a procedure in an example implementation in which a mapping is generated and output by the boundary correspondence system of FIG. 1.
Figure 6:
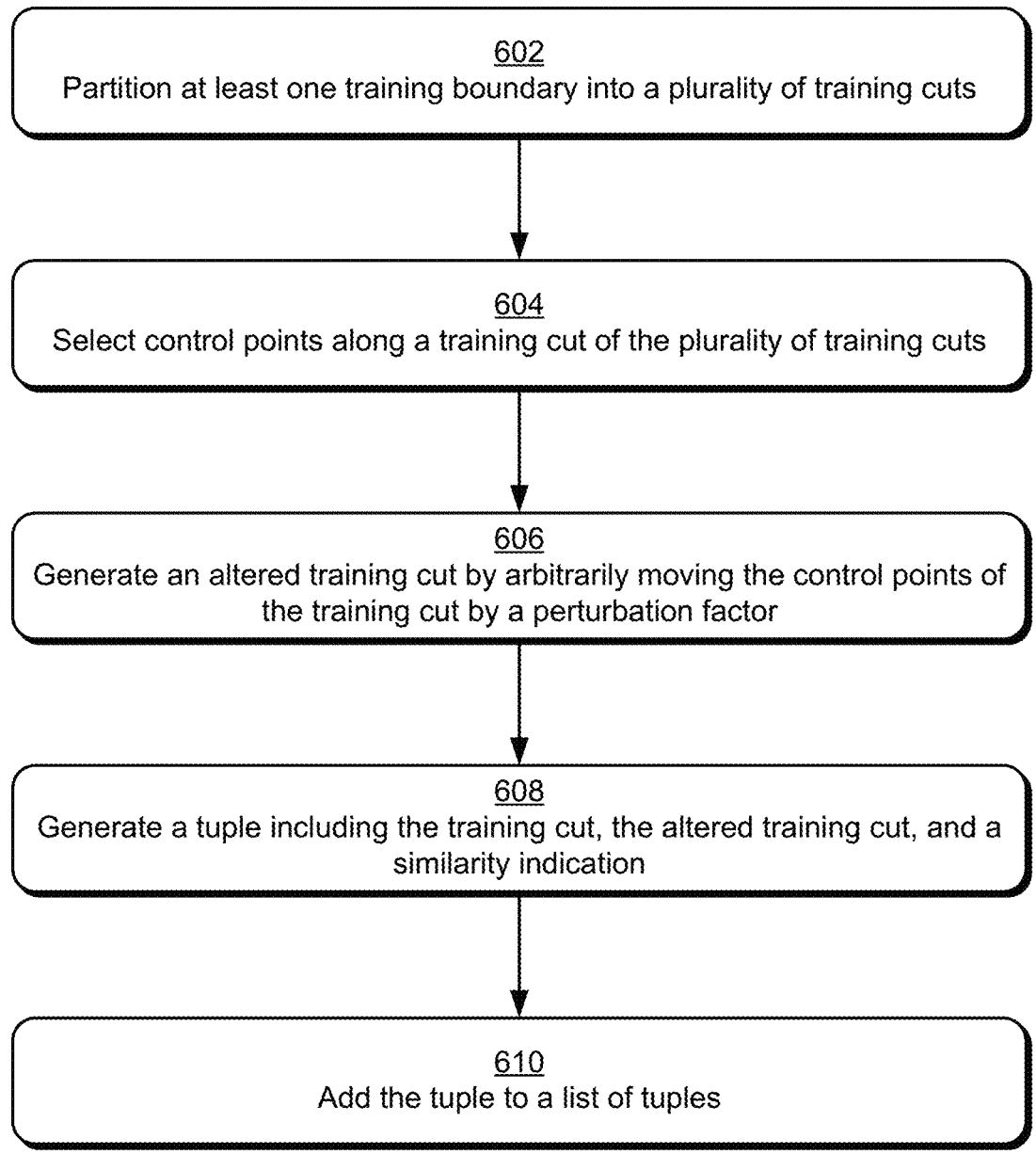
FIG. 6 is a flow diagram depicting a procedure in an example implementation in which a tuple is generated for addition to a list of tuples on which the cut pairing module of FIG. 2 is trained to determine similarity between cuts

FIG. 2 depicts a system 200 in an example implementation showing operation of the boundary correspondence system 116 of FIG. 1 in greater detail to generate a mapping. FIG. 3 depicts a system 300 in an example implementation showing operation of the cut pairing module 210 of FIG. 2 in greater detail to determine a set of corresponding cut pairs 214. FIG. 4 depicts a system 400 in an example implementation showing operation of the training module 306 of FIG. 3 in greater detail to generate a list of tuples, based on which, the cut pairing module 210 is trained to determine similarity between cuts. FIG. 5 depicts a procedure 500 in an example implementation in which a mapping is generated and output by the boundary correspondence system 116 of FIG. 1. FIG. 6 depicts a procedure 600 in an example implementation in which a tuple is generated for addition to a list of tuples on which the cut pairing module 210 of FIG. 2 is trained to determine similarity between cuts.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-13.

To begin in this example, the image processing system 104 receives an indication specifying two digital objects 122, 124 for which the boundary correspondence system 116 is to determine correspondence. The indication, for instance, is received as a user input via the user interface 110 of the computing device 102 specifying the first digital object 122 and the second digital object 124. For example, the first digital object 122 and the second digital object 124 are selected via a gesture, cursor control device, spoken utterance, and so on. In this example, boundary correspondence is determined between two digital objects 122, 124. Other examples are also contemplated, such as to determine boundary correspondence between more than two digital objects.

The digital objects 122, 124 are configurable in a variety of ways, examples of which include vector objects, such as sets of Bezier segments, other mathematically defined visual objects, raster objects, and so forth. Moreover, the digital objects 122, 124 are configurable as two-dimensional digital objects or three-dimensional digital objects. Regardless of the configuration of the digital objects 122, 124, outer boundaries 202 representing outlines or borders of the digital objects 122, 124 are defined. In an example implementation, the digital objects 122, 124 are received as vector objects, and the outer boundaries 202 are defined by extracting Bezier curves representing the border or outline of the underlying vector representation. In another example implementation, the digital objects 122, 124 are received as raster objects, and the boundary correspondence system 116 vectorizes the underlying raster object (e.g., using automatic vectorization) to obtain a vector representation of the raster object. In accordance with this example, the outer boundaries 202 are defined by extracting Bezier curves representing the border or outline of the underlying vector representation.

A boundary partitioning module 204 of the boundary correspondence system 116 then receives the outer boundaries 202 of the digital objects 122, 124. The boundary partitioning module 204 is configured to partition the outer boundaries 202 of the digital objects 122, 124 each into a plurality of cuts 206, 208. A "cut" of a respective digital object is a smaller portion or segment of the outer boundary 202 associated with the respective digital object.

In accordance with this functionality, the boundary partitioning module 204 is configured to partition the outer boundary 202 of the first digital object 122 into a first plurality of cuts 206 and partition the outer boundary 202 of the second digital object 124 into a second plurality of cuts 208 (block 502). The first plurality of cuts 206 includes a sequence of cuts of increasing lengths each centered at a point on the outer boundary 202 of the first digital object 122. Additionally, the second plurality of cuts 208 includes a sequence of cuts of increasing lengths each centered at a point on the outer boundary 202 of the second digital object 124.

For instance, for an anchor point, a, at which a cut is centered, and a length $\lambda$, the cut, $c_{a,\lambda}$, is defined as:

$$c_{a,\lambda} := \{a_{i-1} \ldots a_i \ldots a_{i+r}\}$$

In the above equation, $a_i$ corresponds to the anchor point, a, at which the cut, $c_{a,\lambda}$, is centered, and the length of the $c_{a,\lambda}$ corresponds to $\lambda$. A sequence of cuts, therefore, is defined as:

$$cs_a := \{c_{a,\alpha_1} \ldots c_{a,\alpha_n}\},$$

$$\alpha_1 < \alpha_2 < \ldots < \alpha_n$$

In other words, a sequence of cuts includes cuts of increasing lengths, such that each cut is centered at an anchor point, a.

In some implementations, the first plurality of cuts 206 and the second plurality of cuts 208 include multiple sequences of cuts. In accordance with these implementations, the first plurality of cuts 206 includes a first sequence of cuts of increasing lengths each centered at a first point on the outer boundary 202 of the first digital object 122, a second sequence of cuts of increasing lengths each centered at a second point on the outer boundary 202 of the first digital object 122, and so forth. Similarly, the second plurality of cuts 208 includes a first sequence of cuts of increasing lengths each centered at a first point on the outer boundary 202 of the second digital object 124, a second sequence of cuts of increasing lengths each centered at a second point on the outer boundary 202 of the second digital object 124, and so forth.

The first plurality of cuts 206 and the second plurality of cuts 208 are then used as a basis for determining boundary correspondence between the first digital object 122 and the second digital object 124, as further discussed below. By doing so, the boundary correspondence system 116 captures the relative placement of a respective cut within the context of a respective digital object as a whole.

The first plurality of cuts 206 and the second plurality of cuts 208 are then passed by the boundary partitioning module 204 as an input to a cut pairing module 210. The cut pairing module 210 is configured to compare the first plurality of cuts 206 with the second plurality of cuts 208 (block 504). In doing so, the cut pairing module 210 leverages a deep neural network 212 to determine a measure of similarity for each respective cut from the first plurality of cuts 206 with each respective cut from the second plurality of cuts 208.

The cut pairing module 210 then determines a set of corresponding cut pairs 214 based on the comparison, such that each cut pair 214 in the set of corresponding cut pairs 214 includes a cut from the first plurality of cuts 206 and a cut from the second plurality of cuts 208 (block 506). For instance, the corresponding cut pairs 214 in the set are determined based on the measures of similarity between the first plurality of cuts 206 and the second plurality of cuts 208 determined by the deep neural network 212. A given cut pair 214 contains two cuts that represent similar portions of the outer boundaries 202 of the first digital object 122 and the second digital object 124. In one example, the boundary correspondence system 116 receives two human figures as the digital objects 122, 124. In accordance with this example, a cut pair 214 includes a cut that represents a right foot of the first digital object 122 and a cut that represents a right foot of the second digital object 124.

FIG. 3 depicts a system 300 in an example implementation showing operation of the cut pairing module 210 of FIG. 2 in greater detail to determine a set of corresponding cut pairs 214. In accordance with this functionality, an alignment module 302 receives the first plurality of cuts 206 and the second plurality of cuts 208. The alignment module 302 is configured to determine and align principal axes of the first plurality of cuts 206 and the second plurality of cuts 208. By way of example, the alignment module 302 determines the principal axes for each of the cuts in the first plurality of cuts 206 and each of the cuts in the second plurality of cuts 208. The alignment module 302 then rotates the cuts in the first and second pluralities of cuts 206, 208 such that the cuts of first and second pluralities of cuts 206, 208 are aligned along a common axis. In this way, the alignment module 302 outputs aligned cuts 304 including each of the cuts associated with the first plurality of cuts 206 and each of the cuts associated with the second plurality of cuts 208 aligned along the common axis.

In some implementations, the alignment module 302 is configured to use singular value decomposition to determine a principal axis of a respective cut. In accordance with this technique, the alignment module 302 determines the principal axis as a highest correlation of points of the respective cut in a given direction using the following equation:

$$U \cdot \Sigma \cdot V^* = P$$

In the above equation, P is the set of points on the respective cut being normalized such that the mean of P is located at an origin of an orthonormal set of principal axes. Notably, P is represented by a N×2 matrix and V* is a 2×2 matrix containing the orthonormal principal axes. Given this, the principal axis of the respective cut is determined as the highest singular value in E. The principal axis is then aligned along a common axis prior to comparison by the deep neural network 212. This process is then repeated for the cuts included in the first and second pluralities of cuts 206, 208 such that each of the cuts included in the first and second pluralities of cuts 206, 208 are aligned along the common axis.

The aligned cuts 304 are then passed as an input to the deep neural network 212, which is illustrated as including training module 306. The training module 306 uses deep learning to train the deep neural network 212 to determine a measure of similarity between two cuts, as further discussed in relation to FIG. 4. The deep neural network 212 uses the aligned cuts 304 received from the alignment module 302 as a basis for determining a measure of similarity for each respective cut from the first plurality of cuts 206 with each respective cut from the second plurality of cuts 208. By way of example, the deep neural network 212 receives an aligned cut 304 from the first plurality of cuts 206 and an aligned cut 304 from the second plurality of cuts 208 and determines a measure of similarity for the pair of aligned cuts 304. This process is then repeated to determine a measure of similarity for each cut from the first plurality of cuts 206 with each cut from the second plurality of cuts 208. Further discussion regarding the architecture used by the deep neural network 212 to determine a measure of similarity between two cuts is included below in relation to FIG. 8.

Notably, since the cuts compared by the deep neural network 212 are the aligned cuts 304 that were previously aligned by the alignment module 302, the initial position and/or orientation of two cuts compared by the deep neural network 212 does not affect the measure of similarity determined between the two cuts, as opposed to conventional techniques.

A first cut pair 310 is selected for inclusion in the set of corresponding cut pairs 214 based on the measures of similarity determined by the deep neural network 212. In some implementations, the deep neural network 212 generates a similarity matrix 308 that includes the measures of similarity determined by the deep neural network 212 for each respective cut from the first plurality of cuts 206 with each respective cut from the second plurality of cuts 208. The first cut pair 310 is then selected as having a highest measure of similarity from among each of the possible cut pairs between the first plurality of cuts 206 and the second plurality of cuts 208 included in the similarity matrix 308.

The first cut pair 310 and the similarity matrix 308 are passed as an input to the directional pairing module 312. The directional pairing module 312 is configured to determine additional cut pairs 214 to be included in the set by iteratively processing cuts of the first and second pluralities of cuts 206, 208 adjacent to the first cut pair 310 in a directional manner. For instance, the directional pairing module 312 determines a first adjacent cut pair 314 that includes a cut from the first plurality of cuts 206 and a cut from the second plurality of cuts 208 located adjacent to and clockwise relative to the cuts of the first cut pair 310. The first adjacent cut pair 314 is then added to the set of corresponding cut pairs 214. Further, the directional pairing module 312 determines a second adjacent cut pair 314 that includes a cut from the first plurality of cuts 206 and a cut from the second plurality of cuts 208 located adjacent to and clockwise relative to the first adjacent cut pair 314. The second adjacent cut pair 314 is then added to the set of corresponding cut pairs 214. This process is repeated until the entirety of the outer boundaries 202 of the digital objects 122, 124 are paired together.

Notably, the adjacent cut pairs 314 are determined without skipping portions of the outer boundaries 202 of the digital objects 122, 124. For instance, portions of the outer boundaries 202 between the first cut pair 310 and the first adjacent cut pair 314 are not left unpaired. Moreover, portions of the outer boundaries 202 between the first adjacent cut pair 314 and the second adjacent cut pair 314 are not left unpaired, and so forth. Therefore, each portion of the outer boundaries 202 of the first and second digital objects 122, 124 is accounted for and paired together by the directional pairing module 312.

In an example implementation, the directional pairing module 312 is configured to perform the following algorithm for matching cuts:

Initialize:
    pairs←{(i,j)}, where i,j←arg $\min_{i,j} M_{i,j}$
    $c_1$←Cov($cs_i^{A_1}$)
    $c_2$←Cov($cs_j^{A_2}$)
Search Loop:
    while do Adj($c_1$)≠∅ and Adj($c_2$)≠∅
        k,l←arg $\min_{k \in Adj(c_1), l \in Adj(c_2)} M_{k,l}$
        pairs←pairs∪{(k,l)}
        $c_1$←$c_1$∪Cov($cs_l^{A_1}$)
        $c_2$←$c_2$∪Cov($cs_k^{A_2}$)
    end while The above algorithm is configured to pair cuts from the first plurality of cuts 206, represented by $A_1$, with cuts from the second plurality of cuts 208, represented by $A_2$, using the similarity matrix 308, represented by M. Notably, the Coy operator is representative of functionality to add a cut pair 214 to the set of corresponding cut pairs 214. As shown, the algorithm identifies the matrix pair associated in the similarity matrix 308 having the highest measure of similarity, represented by ($i$, j), and then adds the first cut pair 310 ($cs_i^{A_1}$, $cs_j^{A_2}$) associated with that matrix pair to the set of corresponding cut pairs 214. Notably, the Adj operator is representative of functionality to evaluate a cut located adjacent to a previous cut in the sequence without skipping any portions of the outer boundaries 202. For instance, Adj($c_1$) represents functionality to evaluate cuts adjacent to $c_1$ without skipping any portion of the outer boundary 202 of the first digital object 122. As shown, the algorithm identifies the matrix pair (k, l) from the similarity matrix 308 (M), adjacent to the previous cut pair 214 added to the set of corresponding cut pairs 214 without skipping any portions of the outer boundaries 202. The cuts associated with the matrix pair $cs_i^{A_1}$, $cs_j^{A_2}$ are then added to the set of corresponding cut pairs 214.

By pairing cuts directionally and using the cut pairs 214 as a basis for determining correspondence, the boundary correspondence system 116 maintains an ordered sequence of corresponding anchor point pairs across the outer boundaries 202 of the digital objects 122, 124, as further discussed below.

Returning to FIG. 2, the set of corresponding cut pairs 214 are then passed as an input to the mapping module 216. The mapping module 216 is configured to generate and output the mapping 120 of the first digital object 122 to the second digital object 124. To do so, the mapping module 216 determines an anchor point correspondence 218 by comparing anchor points of corresponding cut pairs 214 in the set (block 508). Notably, an "anchor point" of a cut is a point disposed on the cut. As part of this functionality, the mapping module 216 compares anchor points of the corresponding cut pairs 214 such that a corresponding anchor point pair is determined for each corresponding cut pair 214 in the set. The corresponding anchor point pair of a given cut pair 214 includes an anchor point disposed on the cut in the cut pair 214 from the first plurality of cuts 206 and an anchor point disposed on the cut in the cut pair 214 from the second plurality of cuts 208.

The locations of the anchor points in a corresponding anchor point pair correspond to one another. By way of example, the boundary correspondence system 116 receives two human figures as the digital objects 122, 124 and the cut pairing module 210 determines a cut pair 214 that includes a cut that represents a right foot of the first digital object 122 and a cut that represents a right foot of the second digital object 124. In accordance with this example, the anchor point correspondence 218 for the cut pair 214 includes an anchor point disposed on the heel of the right foot of the first digital object 122 and an anchor point disposed on the heel of the right foot of the second digital object 124.

In some implementations, the anchor point correspondence 218 for a given anchor point pair is determined based on similarity of portions of the outer boundaries 202 of the first and second digital objects 122, 124 surrounding the anchor point pair and an amount of deformation used to match positioning of the anchor points in the anchor point pair. To do so, the mapping module 216 determines a corresponding anchor point pair for a given cut pair 214 ($c_1$, $c_2$) utilizing the following optimization equation over α∈[0, 1]:

$$\min_{a_i \in Anchors(c_1), a_j \in Anchors(c_2)} \alpha \cdot \|v_{c_1}(a_1) - v_{c_2}(a_j)\| + (1 - \alpha) \cdot \|\rho_{c_1}(a_1) - \rho_{c_2}(a_j)\|$$

In the equation above, $c_1$ represents a cut of the first digital object 122 and $c_2$ represents a cut of the second digital object 124. Given an anchor point a disposed on the outer boundary 202 of a respective digital object, a neighborhood is a set of points on the outer boundary 202 of the respective digital object that are in the vicinity of α. In the above equation, a neighborhood is denoted as $v_c(\alpha)$. The neighborhood $v_c(\alpha)$ is determinable in a variety of ways, such as using a log-polar histogram, or using the second moment (i.e., variance) of the curve defined by the neighborhood $v_c(\alpha)$. Notably, the second moment captures the sharpness of a corner. Given this, the first quantity $\|v_{c_1}(\alpha_i) - v_{c_2}(\alpha_j)\|$ captures the similarity of the neighborhoods associated with the anchor points, $\alpha_1$ of cut $c_1$ and $\alpha_j$ of cut $c_2$. For a given cut, c, and an anchor point, α, disposed thereon, the distance along c from a starting anchor point of c is defined as $\rho_c(a)$. The starting anchor point of c, for instance, corresponds to an endpoint of the segment of the outer boundary 202 associated with c. Accordingly, the second quantity $\|\rho_{c_1}(\alpha_i) - \rho_{c_2}(\alpha_j)\|$ captures an amount of deformation used to match the positioning of the two anchor points, $\alpha_i$ and $\alpha_j$. This optimization equation is solved for each of the corresponding cut pairs 214 in the set.

Since the set of corresponding cut pairs 214 is determined directionally by the directional pairing module 312, as discussed above, the corresponding anchor point pairs of the determined anchor point correspondence 218 are ordered sequentially along the outer boundaries 202 of the digital objects 122, 124. By way of example, the anchor point pair associated with the first cut pair 310 corresponds to a first anchor point (i.e., $P_1$) in the anchor point correspondence 218. Further, the anchor point pair associated with the adjacent cut pair 314 located adjacent to and clockwise relative to the first cut pair 310 corresponds to a second anchor point (i.e., $P_2$) in the anchor point correspondence 218, and so forth.

The mapping module 216 then generates the mapping 120 of the first digital object 122 to the second digital object 124 based on the determined anchor point correspondence 218 (block 510). The mapping 120 is represented by the outer boundaries 202 of the digital objects 122, 124 with the corresponding anchor point pairs of the determined anchor point correspondence 218 disposed thereon. Since the anchor point correspondence 218 is determined based on the directionally paired set of corresponding cut pairs 214, the mapping 120 includes the corresponding anchor point pairs of the determined anchor point correspondence 218 disposed sequentially along the outer boundaries 202 of the digital objects 122, 124. By way of example, $P_2$ is located adjacent to and clockwise relative to $P_1$ on the outer boundary 202 of the first digital object 122, $P_3$ is located adjacent to and clockwise relative to $P_2$ on the outer boundary 202 of the first digital object 122, and so forth. Similarly, $P_2$ is located adjacent to and clockwise relative to $P_1$ on the outer boundary 202 of the second digital object 124, $P_3$ is located adjacent to and clockwise relative to $P_2$ on the outer boundary 202 of the second digital object 124, and so forth. The anchor points of a corresponding anchor point pair are also associated with a same number in the ordered sequence. By way of example, $P_1$ of the first digital object 122 corresponds to $P_1$ of the second digital object 124, $P_2$ of the first digital object 122 corresponds to $P_2$ of the second digital object 124, and so forth.

The mapping module 216 then outputs the mapping 120 (block 512). The mapping module 216 is configured to output the mapping 120 in a variety of ways. In an example, the mapping module 216 renders the mapping 120 for display in the user interface 110 of the display device 112. In another example, the mapping module 216 outputs the mapping 120 for a further function of the image processing system 104, such as generating an interpolation between the first digital object 122 and the second digital object 124 as part of automatic animation generation. The mapping 120 generated and output by the boundary correspondence system 116 thus maintains an ordered sequence of corresponding anchor points across the digital objects 122, 124, is invariant to orientation, and overcomes the accuracy challenges of conventional techniques, as further discussed below.

FIG. 4 depicts a system 400 in an example implementation showing operation of the training module 306 of FIG. 3 in greater detail to generate a list of tuples, based on which, the cut pairing module 210 is trained to determine similarity between cuts. In accordance with this functionality, a cut generation module 404 implemented by the training module 306 receives at least one training boundary 402. The training boundaries 402, like the outer boundaries 202, represent outlines or borders of digital objects 118. In some implementations, the cut generation module 404 receives the training boundaries 402 as selected by a user input via the user interface 110 of the computing device 102. Alternatively or in addition, the cut generation module 404 receives the training boundaries 402 as extracted from digital objects 118 specified by a user input via the user interface 110 of the computing device 102.

The cut generation module 404 is configured to generate seed training cuts 406 from the training boundary 402. As part of this, the cut generation module 404 partitions the training boundary 402 into a plurality of seed training cuts 406 (block 602). The cut generation module 404 is capable of partitioning the training boundaries 402 in a variety of ways, an example of which includes partitioning of a respective training boundary 402 into a plurality of seed training cuts 406 of increasing lengths each centered on a point on the respective training boundary 402, similar to the boundary partitioning module 204 of FIG. 2. Additional examples include arbitrary partitioning of the training boundaries 402, partitioning the training boundaries 402 such that each seed training cut 406 is a predefined length, and so forth. In some implementations the end points of the seed training cuts 406 are joined such that the seed training cuts 406 are represented by a closed polygon The seed training cuts 406 are then passed as an input to the perturbation module 408. The perturbation module 408 is configured to generate altered training cuts 410 from the received seed training cuts 406. In accordance with this functionality, a set of control points 412 are selected along a respective seed training cut 406 (block 604). The control points 412, for instance, are randomly selected points disposed on the respective seed training cut 406. An altered training cut 410 is then generated from the received seed training cut 406 by arbitrarily moving the control points 412 disposed thereon by a perturbation factor 414 (block 606). The perturbation factor 414, for instance, represents a degree of arbitrary movement of the control points 412. A similarity indication 416 is then determined indicating whether the altered training cut 410 and the seed training cut 406 from which it was generated are similar or dissimilar based on the perturbation factor 414. For instance, the similarity indication 416 indicates that the seed training cut 406 and the altered training cut 410 are similar (e.g., similarity indication 416 corresponds to a value of 1) if the perturbation factor 414 is less than a threshold value. As an example of this functionality, example 418 depicts similar altered training cuts 410 generated using a relatively small perturbation factor 414. Alternatively or in addition, the similarity indication 416 indicates that the seed training cut 406 and the altered training cut 410 are dissimilar (e.g., similarity indication 416 corresponds to a value of 0) if the perturbation factor 414 is greater than a threshold value.

In some implementations, the perturbation module 408 uses linear skinning techniques to generate the altered training cuts 410. In accordance with this functionality, the randomly selected control points 412 of a given seed training cut 406, c, are represented by (Control (c)). Given this, each point, $p_i$, on the boundary of a given seed training cut 406, c, is related to a control point 412 by the following relation, where p∈c, and $t_j$∈Control(c):

$$p_i = \sum_{j=1}^{|(Control(c))|} w_{i,j} \cdot t_j$$

In the above equation, $w_{i,j}$ is a metric of size |c|×|Control (c)|. Thus, if W={$w_{i,j}$}, the equation above can be rewritten in matrix notation as:

$$c = W \cdot \text{Control}(c)$$

Accordingly, weight, W={$w_{i,j}$}, is assigned such that it is proportional to the distance of a control point 412, $t_j$, from a point, $p_i$, on the boundary of the given seed training cut 406. Once W is known, the control points 412, (Control (c)), are perturbed using the following equation:

$$c' = W \cdot (\text{Control}(c) + \delta)$$

The altered training cut 410 is represented by c' and includes the cut, c, with the control points 412 of c, (Control(c)), altered by the perturbation factor 414, denoted as δ. In some implementations, the perturbation factor 414, δ, corresponds to Gaussian noise. A smaller Gaussian noise, δ, is used in order to generate similar altered training cuts 410, and a larger Gaussian noise, δ, is used in order to generate dissimilar altered training cuts 410.

The perturbation module 408 further generates a tuple 420 that contains an image of the altered training cut 410, an image of the seed training cut 406 from which the altered training cut 410 was generated, and the similarity indication 416 (block 608). Therefore, the tuple 420 includes two images corresponding to the seed training cut 406 and the altered training cut 410, as well as the similarity indication 416 which indicates whether the seed training cut 406 and the altered training cut 410 are similar or dissimilar. The tuple 420 is then added to a list of tuples 420 on which the deep neural network 212 is trained to determine a measure of similarity between cuts (block 610).

The process for generating the tuple 420 is repeatable for the same seed training cut 406, for example, to generate multiple altered training cuts 410 from a single seed training cut 406. The process for generating the tuple 420 is also repeatable for additional seed training cuts 406 of a single training boundary 402, for example, to generate multiple altered training cuts 410 from each of the additional seed training cuts 406 of the single training boundary 402. The process for generating the tuple 420 is also repeatable for the seed training cuts 406 of additional training boundaries 402, for example, to generate multiple altered training cuts 410 from each of the seed training cuts 406 associated with each of the additional training boundaries 402. Therefore, a sufficiently large list of tuples 420 is generated for training the deep neural network 212 from a relatively small number of training boundaries 402.

The deep neural network 212 is then trained on the list of tuples 420 generated by the training module 306 to determine a measure of similarity between two cuts. For instance, the deep neural network 212 is trained on the list of tuples 420 using binary cross entropy loss to determine a measure of similarity between two cuts. As previously discussed, the cut pairing module 210 leverages the trained deep neural network 212 to determine the measures of similarity for each respective cut from the first plurality of cuts 206 with each respective cut from the second plurality of cuts 208. By using deep learning to train the deep neural network 212, the boundary correspondence system 116 more accurately determines corresponding cut pairs 214 between the outer boundaries 202 of the digital objects 122, 124, as compared to conventional techniques. As a result, a mapping 120 generated by the boundary correspondence system 116 includes a more accurate anchor point correspondence 218 generated with increased computational efficiency, as compared to computing devices implementing conventional techniques.

Figure 7:
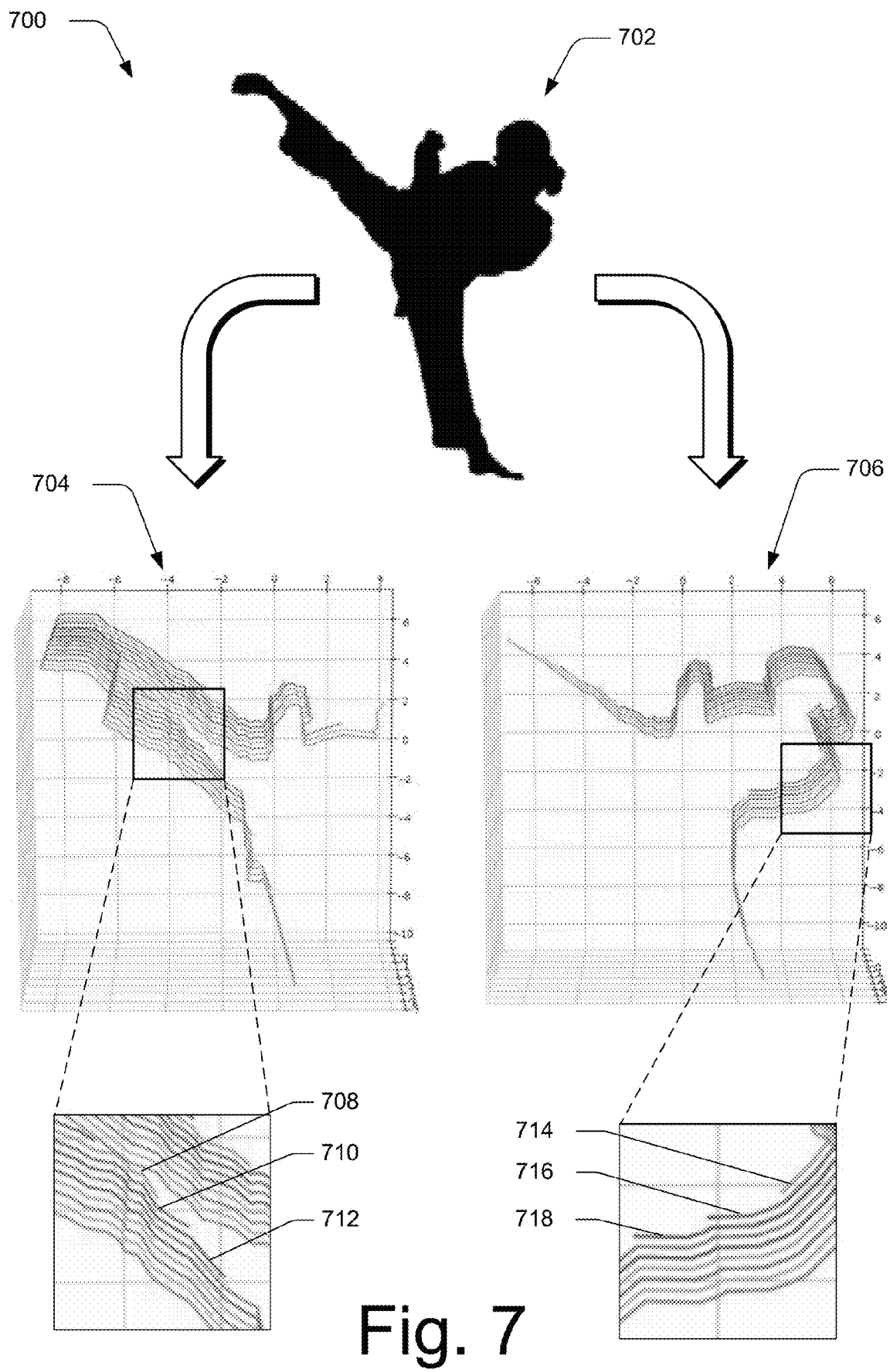
FIG. 7 is an example illustration depicting an example digital object partitioned into a plurality of cuts.

FIG. 7 is an example illustration 700 depicting an outer boundary of an example digital object 702 partitioned into a plurality of cuts. In the illustrated example, the outer boundary 202 of the example digital object 702 is partitioned into a first sequence of cuts 704 and a second sequence of cuts 706. The first sequence of cuts 704 includes cuts 708, 710, 712 of increasing lengths each centered at a point on the outer boundary 202 of the example digital object 702. In addition, the second sequence of cuts 706 includes cuts 714, 716, 718 of increasing lengths each centered at a different point on the outer boundary 202 of the example digital object 702.

Each subsequent cut in a respective sequence of cuts 704, 706 includes the portion of the outer boundary 202 represented by the previous cut in the sequence as well as an additional portion of the outer boundary 202. By way of example, cut 710 of the sequence of cuts 704 includes the portion of the outer boundary 202 represented by previous cut 708 in the sequence, as well as an additional portion of the outer boundary 202. Furthermore, cut 712 of the sequence of cuts 704 includes the portion of the outer boundary 202 represented by previous cut 710 in the sequence, as well as an additional portion of the outer boundary 202, and so forth. Similarly, cut 716 of the sequence of cuts 706 includes the portion of the outer boundary 202 represented by previous cut 714 in the sequence, as well as an additional portion of the outer boundary 202. In addition, cut 718 of the sequence of cuts 706 includes the portion of the outer boundary 202 represented by previous cut 716 in the sequence, as well as an additional portion of the outer boundary 202.

The sequences of cuts 704, 706 are configurable in a variety of ways. In one example, each subsequent cut in a respective sequence of cuts 704, 706 extends past both endpoints of the previous cut in the sequence, as depicted in example illustration 700. In another example, each subsequent cut in a respective sequence of cuts 704, 706 share a common endpoint and extend past the other endpoint of previous cut. In some implementations, each subsequent cut in a respective sequence of cuts 704, 706 extends past the previous cut in the sequence by a predefined length.

Although the outer boundary 202 of the example digital object 702 is illustrated as being partitioned into two sequences of cuts 704, 706, the outer boundaries 202 of the digital objects 122, 124 are capable of being partitioned into any number of pluralities of cuts in accordance with techniques described herein.

Figure 8:
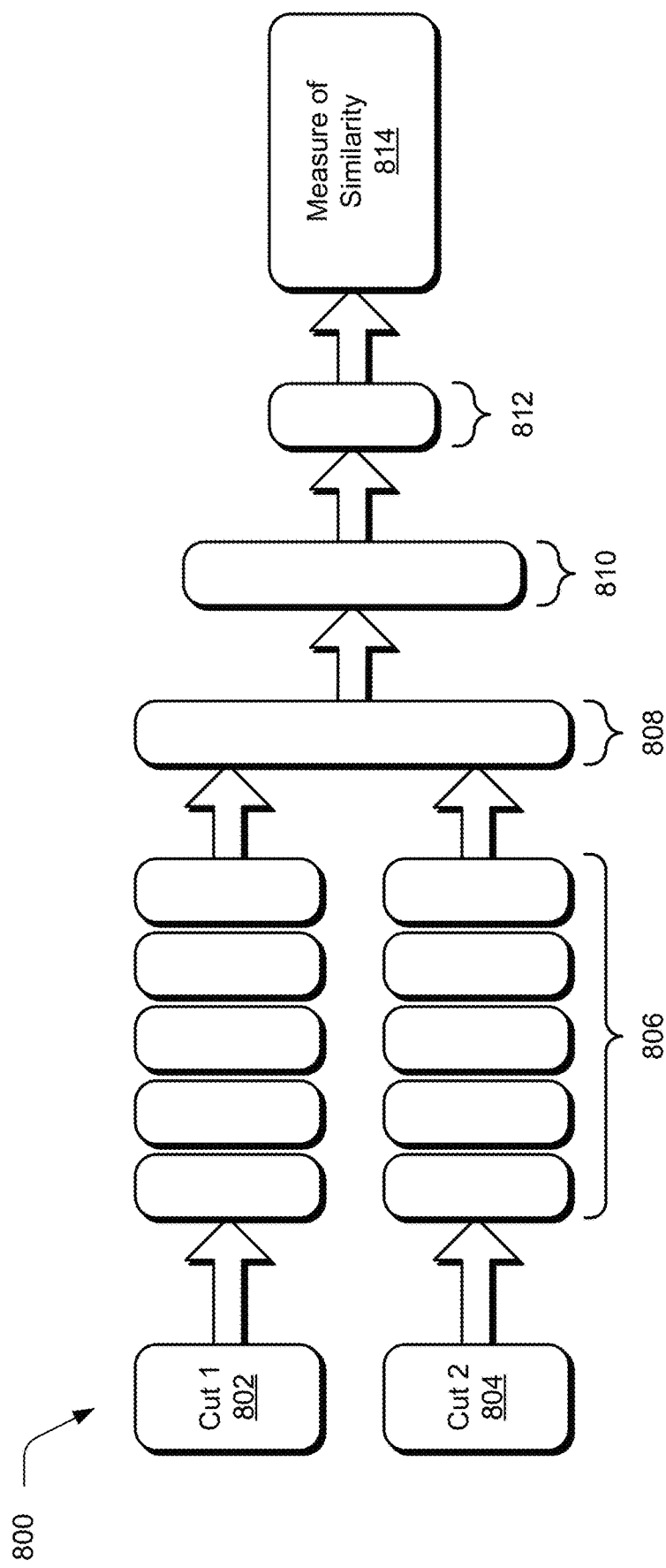
FIG. 8 is an example depicting architecture associated with the deep neural network of FIG. 2 in an example implementation.

FIG. 8 is an example 800 depicting architecture associated with the deep neural network 212 of FIG. 2 in an example implementation. As shown, the deep neural network 212 receives two input cuts 802, 804. The deep neural network 212 is configured to determine a measure of similarity between the two input cuts 802, 804. The input cut 802 is representative of a cut from the first plurality of cuts 206, and the input cut 804 is representative of a cut from the second plurality of cuts 208. In some implementations, the input cuts 802, 804, are received as vector representations, e.g., Bezier curves. Alternatively or in addition, the input cuts 802, 804 are rasterized prior to determining a measure of similarity. For instance, the input cut 802 is rasterized such that the input cut 802 is represented by a raster image, e.g., $img_1$, and the input cut 804 is rasterized such that the input cut 804 represented by a raster image, e.g., $img_2$. To do so, the input cuts 802, 804 are flood filled so that the deep neural network 212 receives filled images as an input rather than vector representations of the input cuts 802, 804.

In the example 800, the deep neural network 212 is illustrated as having a Siamese architecture. In accordance with this functionality, the input cuts 802, 804 each pass through a number of convolution layers 806. The illustrated example 800 depicts five such convolution layers 806. Each of the convolution layers 806 are defined as cnn(n, m, k, s), in which n is the number of input channels, m is the number of output channels, k is the kernel size, and s is stride. In accordance with this functionality, a first convolution layer is defined as cnn(1, 32, 3, 1), a second convolution layer is defined as cnn(32, 64, 3, 1), a third convolution layer is defined as cnn(64, 64, 3, 1), a fourth convolution layer is defined as cnn(64, 128, 3, 1), and a fifth convolution layer is defined as cnn(128, 128, 3, 1). Thus, the convolution layers 806 are defined as:

$$CNN=cnn(1,32,3,1)\cdot cnn(32,64,3,1)\cdot cnn(64,64,3,1)\cdot cnn(64,128,3,1)\cdot cnn(128,128,3,1)$$

In some implementations, each convolution layer uses batch normalization to standardize the inputs, and max-pooling with a kernel size of 2 and a stride of 2. In addition, each convolution layer also uses a Rectified Linear Unit (ReLU) activation function.

The convolution layers 806 are configured to transform an image (e.g., a rasterized image) of the input cuts 802, 804 to a latent space vector:

$$CNN(img) \in \mathbb{R}^l$$

In the above equation, the latent space vector is represented by $\mathbb{R}^l$ where l is the dimension of the latent space. The convolution layers 806 then output the latent space vector for each of the input cuts 802, 804.

The latent space vectors for each of the input cuts 802, 804 are then received by a first linear layer 808 as an input from the convolution layers 806. A linear neural network including a first linear layer 808, a second linear layer 810, and a soft-max function 812 is used to interpret the latent space vectors of the input cuts 802, 804 to measure the similarity between them, using the following equation:

$$LIN=lin(2l,l)\cdot lin(l,2)\cdot softmax(2)$$

As part of this equation, the first linear layer 808, lin (2l, l), and the second linear layer 810, lin(l, 2), are defined as lin(n,m), where n is the number of inputs and m is the number of outputs. The output of the linear layers 808, 810 is converted to the soft-max function 812 to determine a measure of similarity 814 of the two input cuts 802, 804.

In sum, the measure of similarity 814 between two input cuts 802, 804 represented by rasterized images ($img_1$, $img_2$), is determined as follows:

$$Similarity(img_1,img_2)=LIN(CNN(img_1) \circ CNN(img_2))$$

In the equation above, the ○ operator represents functionality to concatenate the two latent space vectors of the two input cuts 802, 804. Notably, the equation above is trained on the list of tuples 420 generated by the training module 306 using deep learning as previously discussed in relation to FIG. 4.

This process is then repeated for each respective cut from the first plurality of cuts 206 and each respective cut from the second plurality of cuts 208 to generate the similarity matrix 308 according to the following equation:

$$M_{i,j}=Similarity(cs_i^1,cs_j^2)$$

In which, $cs_i^1$ represents the first plurality of cuts 206 and $cs_j^2$ represents the second plurality of cuts 208.

Figure 9:
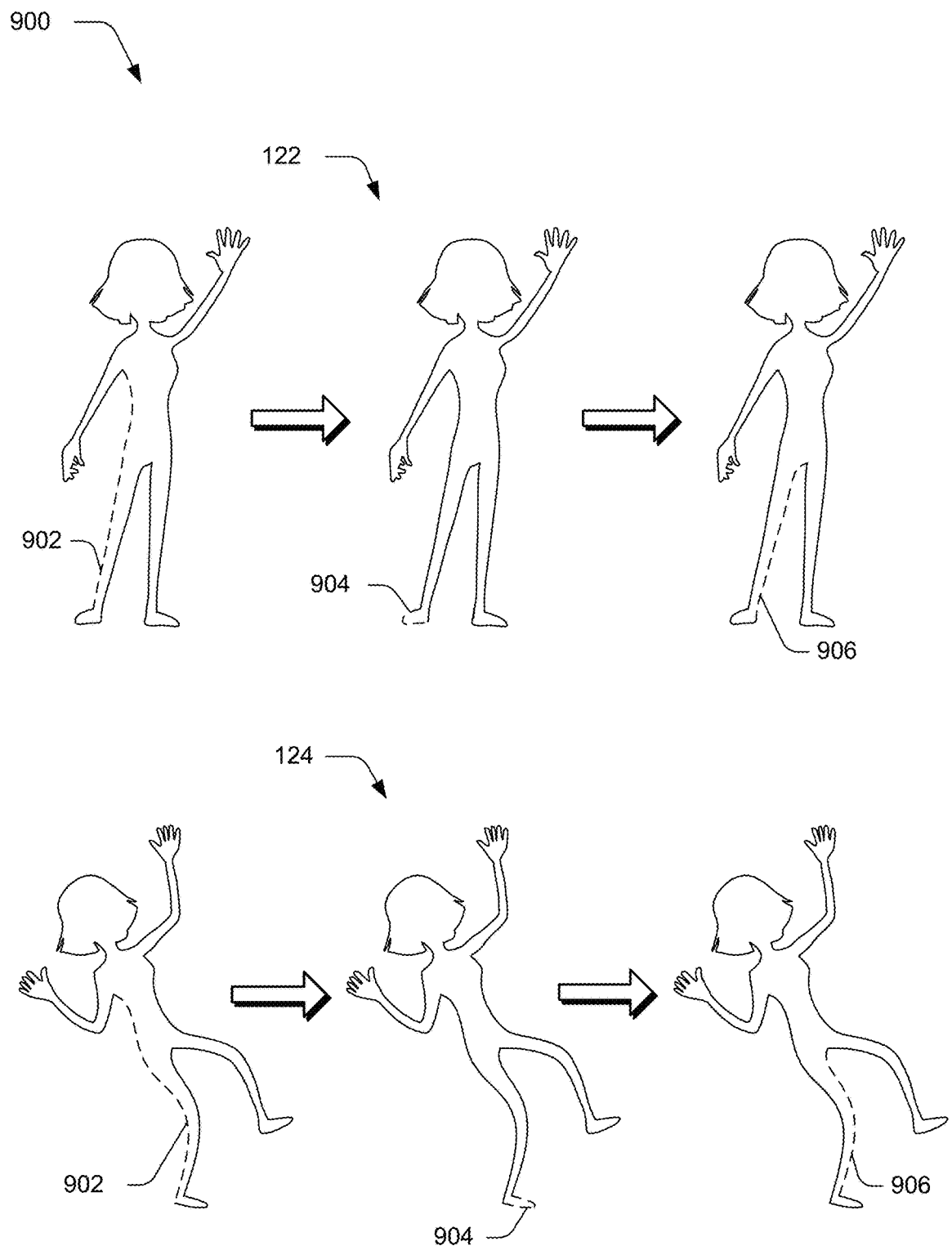
FIG. 9 is an example illustration depicting cut pairs determined by the directional pairing module of FIG. 3.

FIG. 9 is an example illustration 900 depicting cut pairs determined by the directional pairing module 312 of FIG. 3. As shown, the example illustration 900 depicts the outer boundary 202 of the first digital object 122 and the outer boundary 202 of the second digital object 124 with corresponding cut pairs 902, 904, 906 determined by the directional pairing module 312. The corresponding cut pair 902, for instance, corresponds to the first cut pair 310 selected from the similarity matrix 308 as having a highest measure of similarity from among the first plurality of cuts 206 and the second plurality of cuts 208. In the example illustration 900, the two digital objects 122, 124 are depicted as human figures. The corresponding cut pair 902 includes the portions of the outer boundaries 202 of the digital objects 122, 124 corresponding to the side torso and outer legs of the human figures.

The corresponding cut pair 904, for instance, corresponds to the first adjacent cut pair 314 determined by the directional pairing module 312. As shown, the corresponding cut pair 904 includes the portions of the outer boundaries 202 of the digital objects 122, 124 corresponding to the feet of the human figures. Notably, the corresponding cut pair 904 is located adjacent to and counterclockwise relative to the corresponding cut pair 902 without skipping any portions of the outer boundaries 202. For instance, the cut 904 of the first digital object 122 is located counterclockwise relative to the cut 902 of the first digital object 122. Moreover, the cut 904 of the first digital object 122 is located adjacent to the cut 902 of the first digital object 122 without any portion of the outer boundary 202 of the first digital object 122 being skipped.

The corresponding cut pair 906, for instance, corresponds to the second adjacent cut pair 314 determined by the directional pairing module 312. As shown, the corresponding cut pair 906 includes the portions of the outer boundaries 202 of the digital objects 122, 124 corresponding to the inner leg of the human figures. Notably, the corresponding cut pair 906 is located adjacent to and counterclockwise relative to the corresponding cut pair 904 without skipping any portions of the outer boundaries 202. For instance, the cut 906 of the first digital object 122 is located counterclockwise relative to the cut 904 of the first digital object 122. Moreover, the cut 906 of the first digital object 122 is located adjacent to the cut 904 of the first digital object 122 without any portion of the outer boundary 202 of the first digital object 122 being skipped.

This process is repeated until the entirety of the outer boundaries 202 of the digital objects 122, 124 are paired together. Therefore, the set of corresponding cut pairs 214 determined by the directional pairing module 312 includes a sequence of paired cuts, such that each subsequent cut in the sequence is located adjacent to the previous cut in the sequence. Moreover, each portion of the outer boundaries 202 of the first and second digital objects 122, 124 is accounted for and paired together by the directional pairing module 312.

Figure 10:
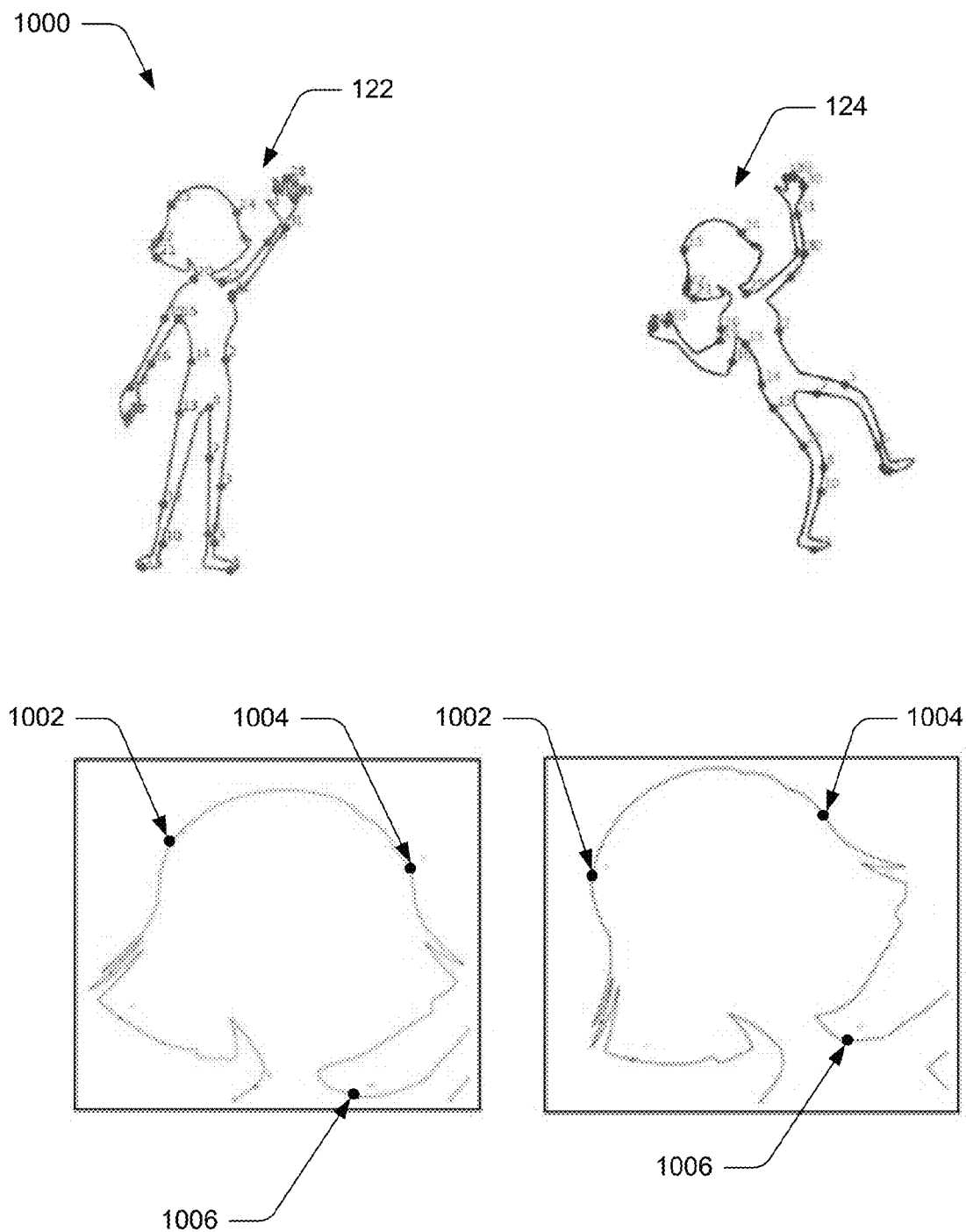
FIG. 10 is an example illustration of a mapping generated by the boundary correspondence system of FIG. 1.

FIG. 10 depicts an example illustration 1000 of a mapping 120 generated by the boundary correspondence system 116 of FIG. 1. For instance, the illustrated example illustration 1000 depicts a mapping 120 of the first digital object 122 to the second digital object 124 generated by the mapping module 216. As previously discussed in relation to FIG. 2, the mapping 120 includes the outer boundaries 202 of the digital objects 122, 124 with the determined anchor point correspondence 218 disposed thereon. As shown, the mapping 120 is represented by an ordered sequence of anchor point pairs disposed along the outer boundaries 202 of the first digital object 122 and the second digital object 124, in which the corresponding anchor point pairs are associated with a same number in the ordered sequence. By way of example, anchor point 1002 ($P_{23}$) of the first digital object 122 is located next to anchor point 1004 ($P_{24}$) of the first digital object 122, which is located next to anchor point 1006 ($P_{25}$) of the first digital object 122, and so forth. Similarly, anchor point 1002 ($P_{23}$) of the second digital object 124 is located next to anchor point 1004 ($P_{24}$) of the second digital object 124, which is located next to anchor point 1006 ($P_{25}$) of the second digital object 124. Additionally, anchor point 1002 ($P_{23}$) of the first digital object 122 corresponds to anchor point 1002 ($P_{23}$) of the second digital object 124, anchor point 1004 ($P_{24}$) of the first digital object 122 corresponds to anchor point 1004 ($P_{24}$) of the second digital object 124, and so forth.

Moreover, the locations of the anchor points in a corresponding anchor point pair correspond to one another. By way of example, the location of anchor point 1002 ($P_{23}$) on the first digital object 122 corresponds to the location of anchor point 1002 ($P_{23}$) on the second digital object 124. The location of anchor point pair 1002 ($P_{23}$) in the example illustration 1000 corresponds to a left, upper portion of the head of the human figure on both of the outer boundaries 202 of the digital objects 122, 124. The location of other anchor point pairs, such as the anchor point pairs 1004, 1006, similarly correspond. Therefore, the mapping 120 generated by the boundary correspondence system 116 maintains an ordered sequence of corresponding anchor point pairs across the digital objects 122, 124.

Figure 11:
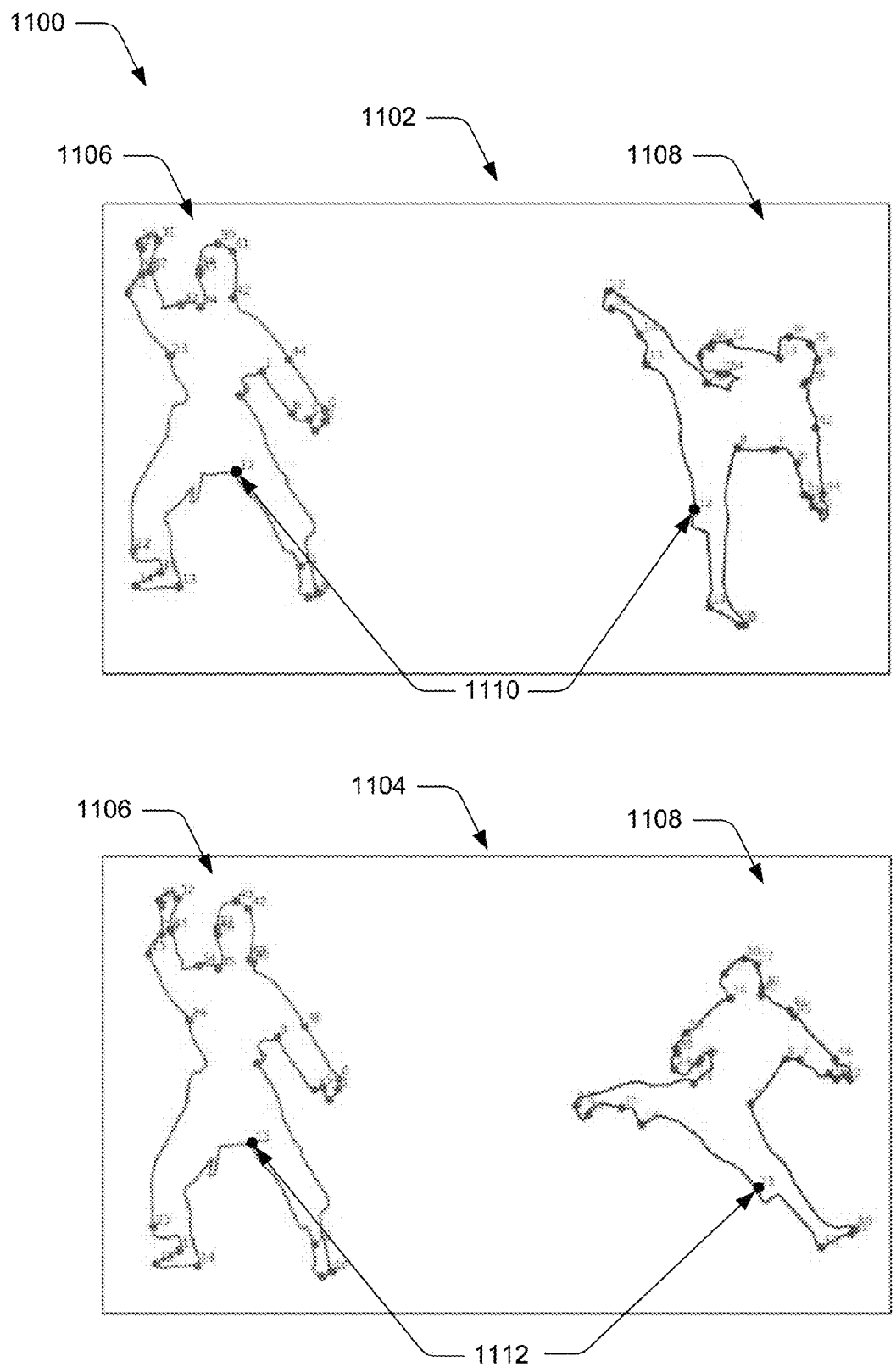
FIG. 11 is another example illustration of a mapping generated by the boundary correspondence system of FIG. 1 showing invariance of the boundary correspondence system to initial orientation of digital objects.

FIG. 11 is another example illustration 1100 of a mapping 120 generated by the boundary correspondence system 116 of FIG. 1 showing invariance of the boundary correspondence system 116 to initial orientation of digital objects. The example illustration 1100 shows a mapping 1102 of a first digital object 1106 to a second digital object 1108. The example illustration 1100 also shows a mapping 1104 of the first digital object 1106 to the second digital object 1108, with the second digital object 1108 being input with a different initial orientation. As shown, the anchor point correspondence 218 of the mapping 1102 corresponds to the anchor point correspondence 218 of the mapping 1104, despite the initial orientation of the second digital object 1108 being different. For instance, the locations of the anchor points of corresponding anchor point pair 1110 of the mapping 1102 and corresponding anchor point pair 1112 of the mapping 1104 are located at the same relative position within the context of the outer boundaries 202 of the digital objects 1106, 1108, as a whole, despite the initial orientation of the second digital object 1108 being different.

Figure 12:
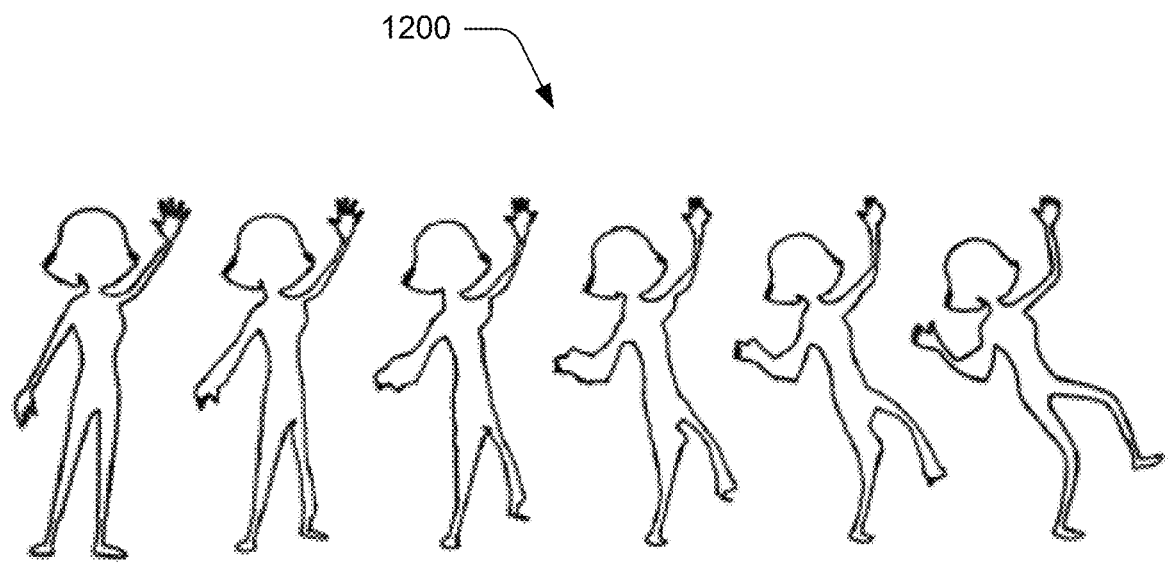
FIG. 12 depicts an example of an interpolation generated between two digital objects by an image processing system implementing the boundary correspondence system of FIG. 1.
Figure 13:
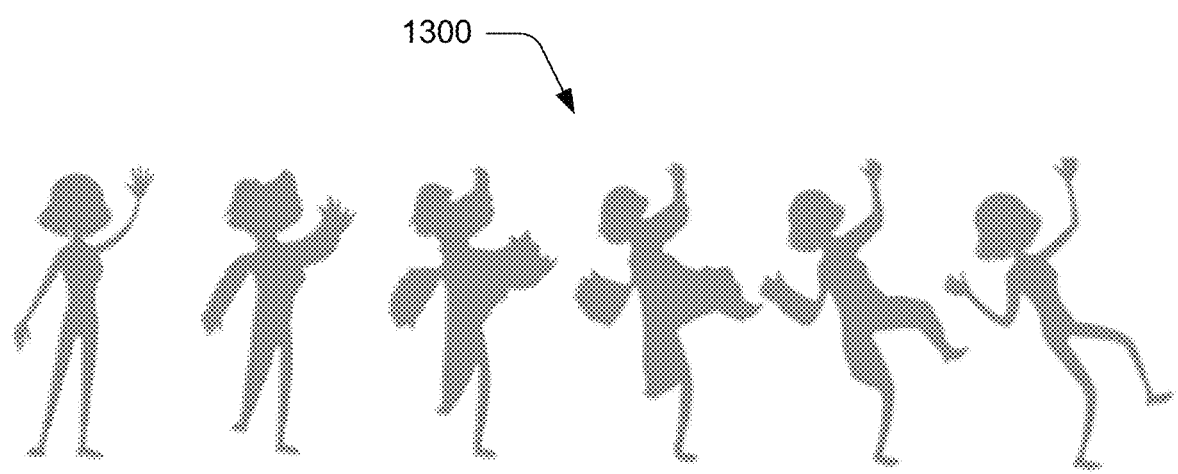
FIG. 13 depicts a prior art example showing an interpolation generated between the two digital objects of FIG. 12 using conventional boundary correspondence techniques.

FIG. 12 depicts an example 1200 of an interpolation generated between two digital objects by the image processing system 104 implementing the boundary correspondence system 116 of FIG. 1. The image processing system 104, for instance, automatically generates frames of an animation by interpolating between the digital objects using the mapping 120 generated by the boundary correspondence system 116. FIG. 13 depicts a prior art example 1300 showing an interpolation generated between the two digital objects of FIG. 12 using conventional boundary correspondence techniques. As shown, the image processing system 104 implementing the boundary correspondence system 116 generates a more robust and accurate interpolation, as compared to the conventional boundary correspondence techniques. Thus, due to the inability of conventional techniques to establish a robust and accurate digital object correspondence, conventional digital image processing systems fail to adequately perform functions that rely on the digital object correspondence, such as interpolation between digital objects as part of an automatic animation generation. Further, conventional digital image processing systems often result in an inefficient use of computational resources.

Example System and Device

Figure 14:
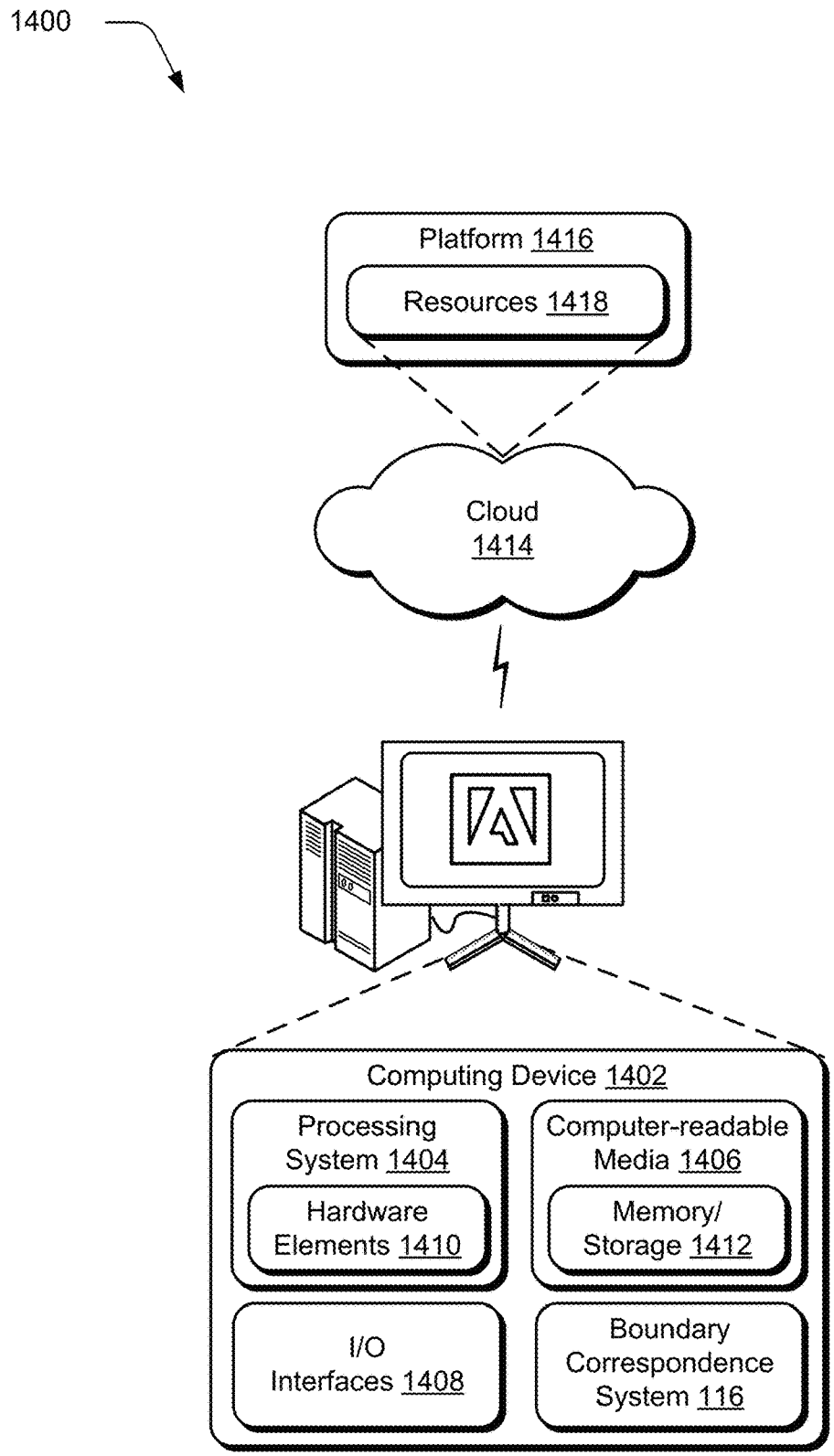
FIG. 14 illustrates an example system including various components of an example device that can be implemented as any type of computing device as described and/or utilize

FIG. 14 illustrates an example system generally at 1400 that includes an example computing device 1402 that is representative of one or more computing systems and/or devices that implement the various techniques described herein. This is illustrated through inclusion of the boundary correspondence system 116. The computing device 1402 is configurable, for example, as a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interface 1408 that are communicatively coupled, one to another. Although not shown, the computing device 1402 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware element 1410 that is configurable as processors, functional blocks, and so forth. This includes implementation in hardware as an application specific integrated circuit or other logic device formed using one or more semiconductors. The hardware elements 1410 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1406 is illustrated as including memory/storage 1412. The memory/storage 1412 represents memory/storage capacity associated with one or more computer-readable media. The memory/storage 1412 includes volatile media (such as random access memory (RAM)) and/or nonvolatile media (such as read only memory (ROM), Flash memory, optical disks, magnetic disks, and so forth). The memory/storage 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1410. The computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supported by various configurations of the computing device 1402 and are not limited to the specific examples of the techniques described herein. This functionality is also implementable all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 abstracts resources and functions to connect the computing device 1402 with other computing devices. The platform 1416 also serves to abstract scaling of resources to provide a corresponding level of scale to encountered demand for the resources 1418 that are implemented via the platform 1416. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
partitioning, by a computing device, outer boundaries of first and second digital objects into a first plurality of cuts and a second plurality of cuts, respectively, at least two cuts of the first plurality of cuts including a same portion of the outer boundary of the first digital object, and at least two cuts of the second plurality of cuts including a same portion of the outer boundary of the second digital object;
comparing, by the computing device, the first plurality of cuts with the second plurality of cuts;
determining, by the computing device, a set of corresponding cut pairs based on the comparing, each said cut pair having a cut from the first plurality of cuts and a cut from the second plurality of cuts;

determining, by the computing device, correspondence of anchor point pairs, one to another, by comparing anchor points of the set of corresponding cut pairs;

generating, by the computing device, a mapping of the first digital object to the second digital object based on the determined correspondence of the anchor point pairs; and outputting, by the computing device, the mapping.

2. The method as described in claim 1, wherein the first plurality of cuts includes multiple cuts of different lengths each centered at a first respective point along the outer boundary of the first digital object, and the second plurality of cuts includes multiple cuts of different lengths each centered at a second respective point along the outer boundary of the second digital object.

3. The method as described in claim 1, wherein comparing the first plurality of cuts with the second plurality of cuts includes determining a measure of similarity for each respective cut from the first plurality of cuts with each respective cut from the second plurality of cuts.

4. The method as described in claim 1, wherein comparing the first plurality of cuts with the second plurality of cuts includes determining principal axes of the first plurality of cuts and the second plurality of cuts, and aligning the principal axes by rotating one or more individual cuts in at least one of the first plurality of cuts and the second plurality of cuts.

5. The method as described in claim 1, wherein comparing the first plurality of cuts with the second plurality of cuts includes leveraging a deep neural network trained on a list of tuples, each said tuple containing two images and an indication of whether the two images are similar or dissimilar.

6. The method as described in claim 5, wherein a tuple of the list of tuples is generated by:

partitioning, by the computing device, at least one training boundary into a plurality of seed training cuts;

selecting, by the computing device, control points along a seed training cut of the plurality of seed training cuts, the seed training cut corresponding to a first image of the two images; and generating, by the computing device, an altered training cut by arbitrarily moving the control points of the seed training cut by a perturbation factor, the altered training cut corresponding to a second image of the two images, and the two images indicated as similar or dissimilar based on the perturbation factor.

7. The method as described in claim 1, wherein the set of corresponding cut pairs are determined, in part, by identifying a first cut pair based on similarity of the first plurality of cuts with the second plurality of cuts.

8. The method as described in claim 7, wherein additional cut pairs in the set are determined by iteratively processing cuts of the first and second pluralities of cuts adjacent to the first cut pair.

9. The method as described in claim 8, wherein the iteratively processing the cuts includes identifying a next iterative cut pair adjacent to the first cut pair that includes a first segment of the outer boundary of the first digital object and a second segment of the outer boundary of the second digital object, the first segment and the second segment positioned in a same rotational direction relative to the first cut pair.

10. The method as described in claim 1, wherein the correspondence of the anchor point pairs is determined based on similarity of portions of the outer boundaries of the first and second digital objects surrounding the anchor point pairs and an amount of deformation used to match positioning of the anchor point pairs.

11. The method as described in claim 1, wherein the mapping is represented by an ordered sequence of the anchor point pairs disposed along the outer boundaries of the first and second digital objects, each said anchor point pair being associated with a same value in the ordered sequence.

12. The method as described in claim 11, wherein each subsequent value in the ordered sequence represents a subsequent one of the corresponding anchor point pairs positioned in a particular rotational direction relative to a previous one of the corresponding anchor point pairs represented by a previous value in the ordered sequence.

13. The method as described in claim 1, wherein the outer boundaries of the first and second digital objects are sets of Bezier segments.

14. The method as described in claim 1, further comprising:

receiving the first and second digital objects as raster images; and defining the outer boundaries of the first and second digital objects based on outlines of the raster images.

15. A non-transitory computer-readable medium storing executable instructions, which when executed by a processing device, cause the processing device to perform operations comprising:

partitioning outer boundaries of first and second digital objects into a first plurality of cuts and a second plurality of cuts, respectively;

determining, using a deep neural network trained on a list of tuples, a measure of similarity for each respective cut from the first plurality of cuts with each respective cut from the second plurality of cuts, each said tuple including:

a seed training cut partitioned from an input boundary;

an altered training cut generated by arbitrary movement of control points disposed on the seed training cut by a perturbation factor; and an indication of whether the seed training cut and the altered training cut are similar or dissimilar based on the perturbation factor;

determining a set of corresponding cut pairs based on the measures of similarity, each said cut pair having a cut from the first plurality of cuts and a cut from the second plurality of cuts; and generating and outputting a mapping of the first digital object to the second digital object based on a correspondence of anchor point pairs determined from a comparison of anchor points of the corresponding cut pairs in the set.

16. The non-transitory computer-readable medium as described in claim 15, wherein the first plurality of cuts includes multiple cuts of different lengths each centered at a first respective point along the outer boundary of the first digital object, and the second plurality of cuts includes multiple cuts of different lengths each centered at a second respective point along the outer boundary of the second digital object.

17. A system comprising:

a processing device; and a computer-readable storage medium having instructions stored thereon that, responsive to execution by the processing device, cause the processing system to perform operations including:

partitioning outer boundaries of first and second digital objects into a first plurality of cuts and a second plurality of cuts, respectively, at least two cuts of the first plurality of cuts including a same portion of the outer boundary of the first digital object, and at least two cuts of the second plurality of cuts including a same portion of the outer boundary of the second digital object;

determining a set of corresponding cut pairs by comparing the first plurality of cuts with the second plurality of cuts, each said cut pair having a cut from the first plurality of cuts and a cut from the second plurality of cuts;

determining correspondence of anchor point pairs, one to another, by comparing anchor points of the set of corresponding cut pairs;

generating a mapping of the first digital object to the second digital object based on the determined correspondence of the anchor point pairs; and outputting the mapping.

18. The system as described in claim 17, wherein the set of corresponding cut pairs include a first cut pair determined based on similarity of the first plurality of cuts with the second plurality of cuts and additional cut pairs determined by iteratively processing cuts of the first and second pluralities of cuts adjacent to the first cut pair.

19. The system as described in claim 17, wherein the correspondence of the anchor point pairs is determined based on similarity of portions of the outer boundaries of the first and second digital objects surrounding the anchor point pairs and an amount of deformation used to match positioning of the anchor point pairs.

20. The system as described in claim 17, wherein the mapping is represented by an ordered sequence of anchor point pairs disposed along the outer boundaries of the first and second digital objects, each said anchor point pair being associated with a same value in the ordered sequence.

* * * * *